US008194263B2

(12) United States Patent
Aritomi et al.

(10) Patent No.: US 8,194,263 B2
(45) Date of Patent: Jun. 5, 2012

(54) TECHNIQUE TO PROCESS A TINT BLOCK IMAGE FOR RESTRAINING A MATERIAL PRINTED BY A PRINTING APPARATUS FROM BEING COPIED

(75) Inventors: Masanori Aritomi, Tokyo (JP); Tatsuro Uchida, Yokohama (JP); Hiroaki Nakata, Kawasaki (JP); Masaki Yamamichi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1140 days.

(21) Appl. No.: 11/463,961

(22) Filed: Aug. 11, 2006

(65) Prior Publication Data

US 2007/0091350 A1    Apr. 26, 2007

(30) Foreign Application Priority Data

Oct. 21, 2005   (JP) ................. 2005-306647

(51) Int. Cl.
  G06F 3/12    (2006.01)
  G06F 7/04    (2006.01)
  G06K 15/00   (2006.01)
  H04N 1/40    (2006.01)
  H04N 7/167   (2011.01)

(52) U.S. Cl. ............... 358/1.14; 358/1.11; 358/1.18; 358/462; 380/201; 726/32; 726/33

(58) Field of Classification Search .......... 358/1.14, 358/462, 1.11, 1.18, 528; 380/201; 726/2, 726/32, 33; 400/1, 55, 279, 333.2, 342
See application file for complete search history.

(56) References Cited

U.S. PATENT DOCUMENTS

| 6,178,431 | B1 | 1/2001 | Douglas |
| 6,532,039 | B2 | 3/2003 | Anderson |
| 2004/0150859 | A1 | 8/2004 | Hayashi |
| 2005/0174596 | A1* | 8/2005 | Uchida et al. ............ 358/1.14 |

FOREIGN PATENT DOCUMENTS

| JP | H05-305748 A | 11/1993 |
| JP | 2001-197297 A | 7/2001 |
| JP | 2001-324898 A | 11/2001 |
| JP | 2004-355077 A | 12/2004 |
| JP | 2005-216181 A | 8/2005 |
| JP | 2005-235181 A | 9/2005 |

OTHER PUBLICATIONS

Wikipedia Encyclopedia Justification Dec. 2004 p. 1.*
J. Walker Instruction to Foramat a Manuscript 2000 all pages.*
Ohio University Microsoft Word 2003 Reference Guide Jul. 2004 p. 3.*
ITaP, Microsoft Publiser 2002, Fall 2003. ITaP, Microsoft Publisher 2002, pp. 1-44.*
EBook, Microsoft Publisher 2003, 2003, EBook, Microsoft Publisher 2003, pp. 1-126.*

* cited by examiner

Primary Examiner — Benny Q Tieu
Assistant Examiner — Ngon Nguyen
(74) Attorney, Agent, or Firm — Canon U.S.A., Inc. IP Division

(57) ABSTRACT

In an information processing apparatus, a first display screen is displayed to allow for specifying whether to form a copy-forgery-inhibited unit pattern or an array of copy-forgery-inhibited unit patterns, and a second display screen is displayed to allow for specifying a position at which to form the copy-forgery-inhibited unit pattern by selecting the position from a plurality of candidates.

6 Claims, 18 Drawing Sheets

FIG. 5

| |
|---|
| TYPE OF OBJECT TO BE PRINTED AS TINT BLOCK (TEXT/IMAGE) ~2001 |
| INPUT FILE NAME (WHEN IMAGE IS SELECTED) FONT INFORMATION (WHEN TEXT IS SELECTED) ~2002 |
| PRINTING ORDER OF TINT BLOCK PATTERNS (WATERMARK/SUPERIMPOSE) ~2003 |
| INFORMATION INDICATING ANGLE AT WHICH TO PRINT OBJECT ~2004 |
| INFORMATION INDICATING COLOR OF TINT BLOCK PATTERN ~2005 |
| INFORMATION INDICATING WHETHER TO EXCHANGE PATTERNS BETWEEN FOREGROUND PATTERN AND BACKGROUND PATTERN ~2006 |
| INFORMATION ASSOCIATED WITH CAMOUFLAGE IMAGE PATTERN ~2007 |
| INFORMATION ASSOCIATED WITH INTENSITY OF FOREGROUND PATTERN ~2008 |
| INFORMATION ASSOCIATED WITH INTENSITY OF BACKGROUND PATTERN ~2009 |

FIG. 11A
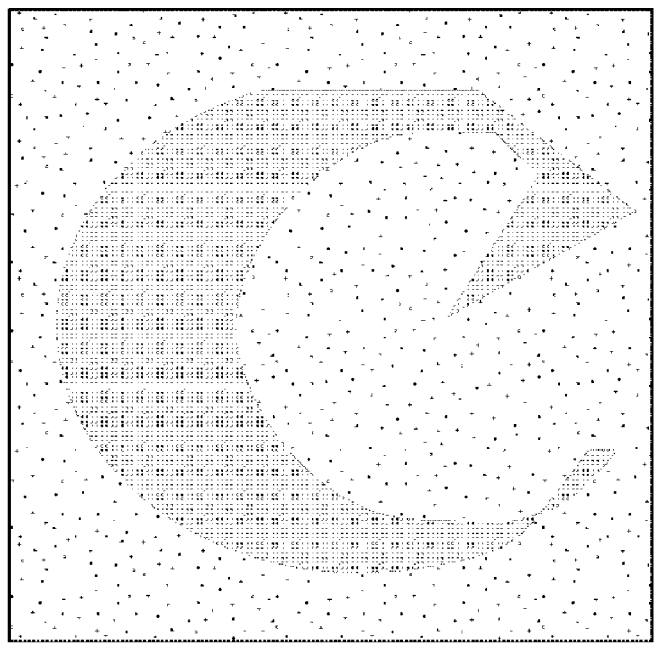
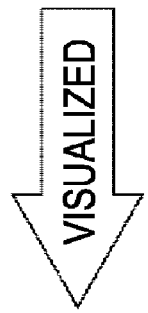
FIG. 11B
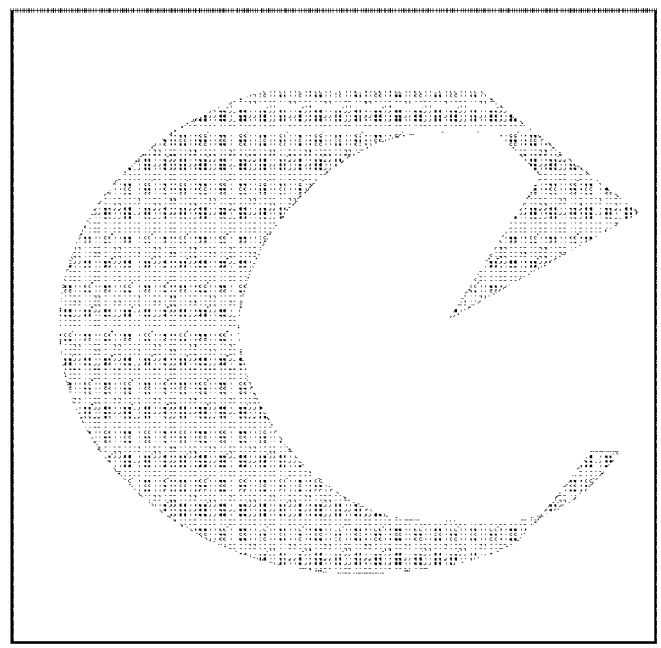

FIG. 15
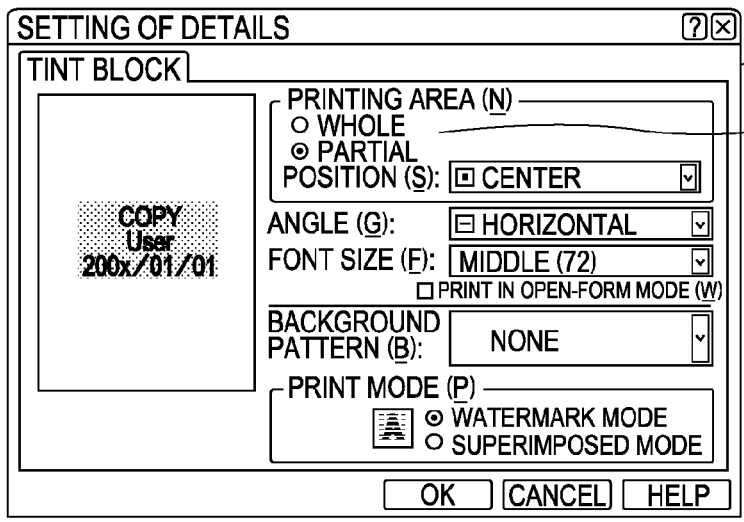
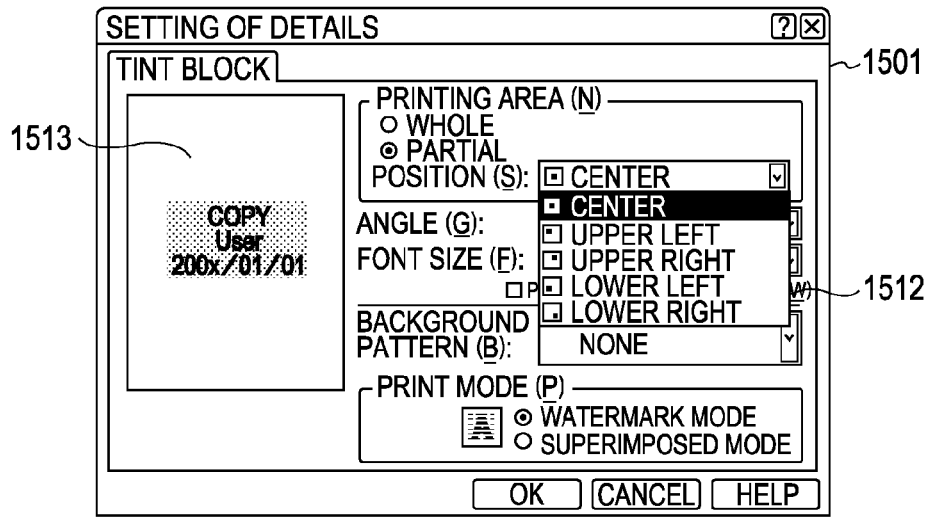
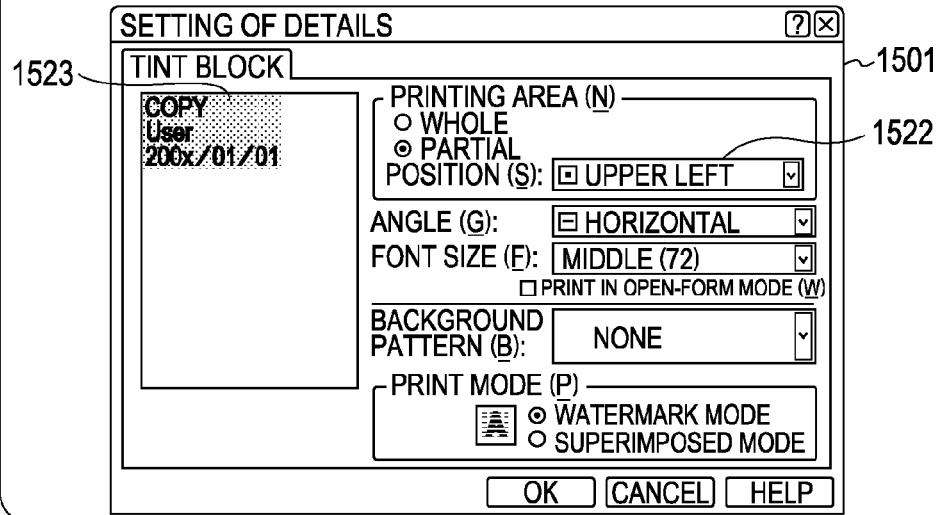

TECHNIQUE TO PROCESS A TINT BLOCK IMAGE FOR RESTRAINING A MATERIAL PRINTED BY A PRINTING APPARATUS FROM BEING COPIED

BACKGROUND OF THE INVENTION

1. Field of the Invention

The present invention relates to an information processing apparatus, a printing apparatus, and an information processing method. More particularly, the present invention relates to a technique, in a system including an information processing apparatus such as a personal computer and a printing apparatus such as a printer, to process a tint block image for restraining a material printed by a printing apparatus from being copied.

2. Description of the Related Art

It is known to print content such as a form document or a resident card on special paper called copy protection paper which has been subjected to special printing to prevent or restrain an original material from being copied. In an original material, an image printed on copy protection paper is difficult for human eyes to perceive. However, if the original material is copied, a character string such as "Copy Inhibited" appears on a copied material. This causes a person who has copied the original material to hesitate to use the copied material. By letting the public know that form documents or the like are printed on copy protection paper, it is possible to cause persons to hesitate to copy form documents or the like.

However, a problem with copy protection paper is its high cost compared with plain paper. Another problem is that only a character string preprinted on copy protection paper during production of the copy protection paper appears on a copied material. This limits use of the copy protection paper.

Nowadays, various kinds of contents such as form documents, resident cards, etc. are produced in digital form. However, in many cases, at present, when contents are output, they are printed on plain paper using a printer.

In view of the above, much attention is now focused on a technique to produce copy protection paper using a computer and a printer instead of using a printing plate (see, for example, Japanese Patent Laid-Open No. 2001-197297). In this technique, when content produced using a computer is printed, image data called a tint block pattern is produced in addition to the content data, and the tint block pattern and the content data are printed in a superimposed manner. The tint block pattern is also called a copy-forgery-inhibited pattern. The tint block image on an original material (produced by using a printer) is perceived by human eyes as a simple pattern, a background image, or the like. However, if the original material is copied, a particular character string or a particular image appears on the copied material. Therefore, this feature of the original material restrains the original material from being copied, as with the special copy protection paper described above. Note that great advances in performance of printers have made it possible to achieve this technique.

When a tint block image producing using a computer is output such that the tint block image is superimposed on content data, it is possible to use ordinary paper on which to output the tint block image, and thus this technique is advantageous in terms of cost compared with the technique using forgery-protected paper. Furthermore, because it is allowed to produce a tint block image when content data is printed, it is possible to freely determine the color of the tint block image and a character string which will be visualized when an original printed material is copied. Another advantage is that information indicating date/time of printing and/or information specific to a printing apparatus can be used as a tint block image.

As described above, if an original printed material including a tint block image is copied, a particular character string or an image appears in a visible form on the copied material, whereby it is possible to suppress use of the copied material.

To achieve the above effects, a tint block image used herein basically includes two areas: a first area which is included in an original material and which will remain in a copied material; and a second area which is also included in the original material but which will disappear or will become low in intensity on the copied material compared with the intensity of the image in the first area. It is desirable that the tint block image be printed such that both areas have substantially the same intensity on the original material, and that a character string or the like which is hidden in the tint block image on the original material (and which will be visualized on a copied material) cannot be perceived by human eyes. This image area of the tint block image which is hidden in the original material but which will appear in a human-eye-visible form on a copied material is herein referred to as a latent mark (or a latent mark image). The image area which will disappear on a copied material or which will become low in intensity compared with the intensity of the latent mark visualized on the copied material is referred to as a background (or a background image). Thus, a tint block image basically includes a latent mark image and a background image. Note that the latent mark is also referred to as a foreground image, for example, when a user interface is discussed.

The latent mark image is formed of dots concentrated in a particular area. On the other hand, the background area is formed of dots dispersed in a particular area. Note that dots in these two areas are formed such that the density of dots is equal for these two areas so that it is difficult to distinguish the latent mark area and the background area from each other on an original material of the tint block image.

FIG. 10 shows a manner in which dots are formed in these two image areas. As shown in FIG. 10, a tint block image is composed of a background area in which dots are formed at dispersed positions and a latent mark area in which dots are formed at concentrated positions. The dots in these two areas can be formed using a halftone dot method under different conditions or a dither method under different conditions. For example, when a tint block image is produced using the halftone dot method, a latent mark area is produced using a small line density, while a background area is produced using a large line density. In the case in which the dither method is used, a latent mark area is produced using a dot-concentrated dither matrix, while a background area is produced using a dot-dispersed dither matrix.

In general, a scanner unit and a printing unit of a copier have a limitation on the reproduction ability depending on the input resolution of detecting small dots on a document or the output resolution of forming small dots on paper. If the background area of the tint block image is formed of dots with a size smaller than the lower resolution limit of the copier, and if the latent mark area of the tint block image is formed of dots with a size greater than the lower resolution limit of the copier, the dots of the latent mark area are reproduced on a copied material but the small dots of the background area are not reproduced. Because of this feature, if the tint block image is copied, the latent mark is visualized on the copied material. Hereinafter, the image visualized on the copied material will be referred to as a visualized image. Even if the background area is reproduced on a copied material, if the latent mark area on the copied material has a resolution that allows the latent mark area to be clearly perceived, it is possible to achieve an effect similar to that achieved when no dots are reproduced for the background area.

FIGS. 11A and 11B show a manner in which a latent mark is visualized. As can be seen from these figures, an image composed of concentrated dots is reproduced on a copied material, but an image composed of dispersed dots is not reproduced on the copied material.

Note that printing of a tint block does not necessarily need to be performed in the above-described manner, but a tint block may be printed in any manner if a visible character string or the like appears on a copied material. For example, a character string or the like may be formed in a background area so that the character string appears in an open shape (void shape) on a copied material. Note that in this case, the purpose of the tint block printing is also achieved.

The tint block is placed over the entire area (effective printing area) of a page so that it becomes possible to more effectively prevent an original material from being copied. Because the content of a document to be printed varies from page to page, a tint block is placed also in an area that does not overlap a document area so that a visualized image will appear over a large area thereby enhancing the capability of preventing the original material from being copied, and also enhancing the capability of adapting to variations in contents of pages.

However, placing a tint block over the entire area of a page results in an increase in the memory capacity necessary to render the tint block pattern and a decrease in the printing speed.

SUMMARY OF THE INVENTION

In view of the above, the present invention provides a technique to achieve a low-cost tint block which provides great convenience to users.

According to an embodiment of the present invention, there is provided an information processing apparatus including a position specifying unit configured to specify a position at which to form a copy-forgery-inhibited unit pattern, and a determination unit configured to determine a justification mode in which to justify a latent character string in accordance with the specified position.

According to an embodiment of the present invention, there is provided a printing apparatus including a position specifying unit configured to specify a position at which to form a copy-forgery-inhibited unit pattern, a determination unit configured to determine a justification mode in which to justify a latent character string in accordance with the specified position, and a printing unit configured to print an image including the copy-forgery-inhibited unit pattern at the specified position.

According to an embodiment of the present invention, there is provided an information processing method that includes specifying a position at which to form a copy-forgery-inhibited unit pattern, and determining a justification mode in which to justify a latent character string in accordance with the specified position.

Further features of the present invention will become apparent from the following description of exemplary embodiments with reference to the attached drawings.

BRIEF DESCRIPTION OF THE DRAWINGS

FIG. 5 shows an example of a data format of property data representing printing conditions of a tint block.

FIGS. 11A and 11B show a manner in which a tint block image appears on a copied material when an original material is copied.

FIG. 15 shows examples of manners in which settings are made via an operation screen of an operation unit.

DESCRIPTION OF THE EMBODIMENTS

The present invention is described in further detail below with reference to exemplary embodiments in conjunction with the accompanying drawings. In the present description, the term "tint block" is used to describe a copy-forgery-inhibited pattern which cannot be easily perceived when viewed on an original material, but which appears on a copied material when the original material is copied. This feature of the tint block makes it possible to distinguish the copied material from the original material, and thus restrains the original material from being copied.

In the present description, an area which is visualized in a copy (copied material) of an original printed material including a tint block image is referred to as a latent mark area or a foreground area. On the other hand, on a copied material, an area which disappears or becomes low in intensity compared with the intensity of a latent mark area is referred to as a background area. For example, if an original printed material, which includes text information or image information described in a latent mark area according to information given by a user, is copied, the text information or image information in the latent mark area has higher intensity on the copied material than the intensity of a background area so that the text information or image information in the latent mark area can be easily perceived. Although in the following discussion, it is presumed by way of example that a latent mark area includes only text information in the form of a latent character string, the latent mark area may include only image information or a combination of image information and text information.

Note that in the present invention, the tint block image is not limited to the above-described type. For example, text information or image information may be described in a background area, and a latent mark area may be produced in a periphery of the background area so that the text information or the image information in the background area is represented in an open form on a copied material.

In the present invention, there are no particular restrictions on the type, the color, the shape, the size, and the like of the tint block image. There is also no restriction on the process of producing the tint block image.

A process of producing image data of a tint block image and an associated printing process according to an embodiment are described below. In the following description, by way of example but not limitation, it is presumed that the process of producing the image data and the printing process are performed in a system including a computer serving as an information processing apparatus and a printer serving as a printing apparatus.

Figure 1:
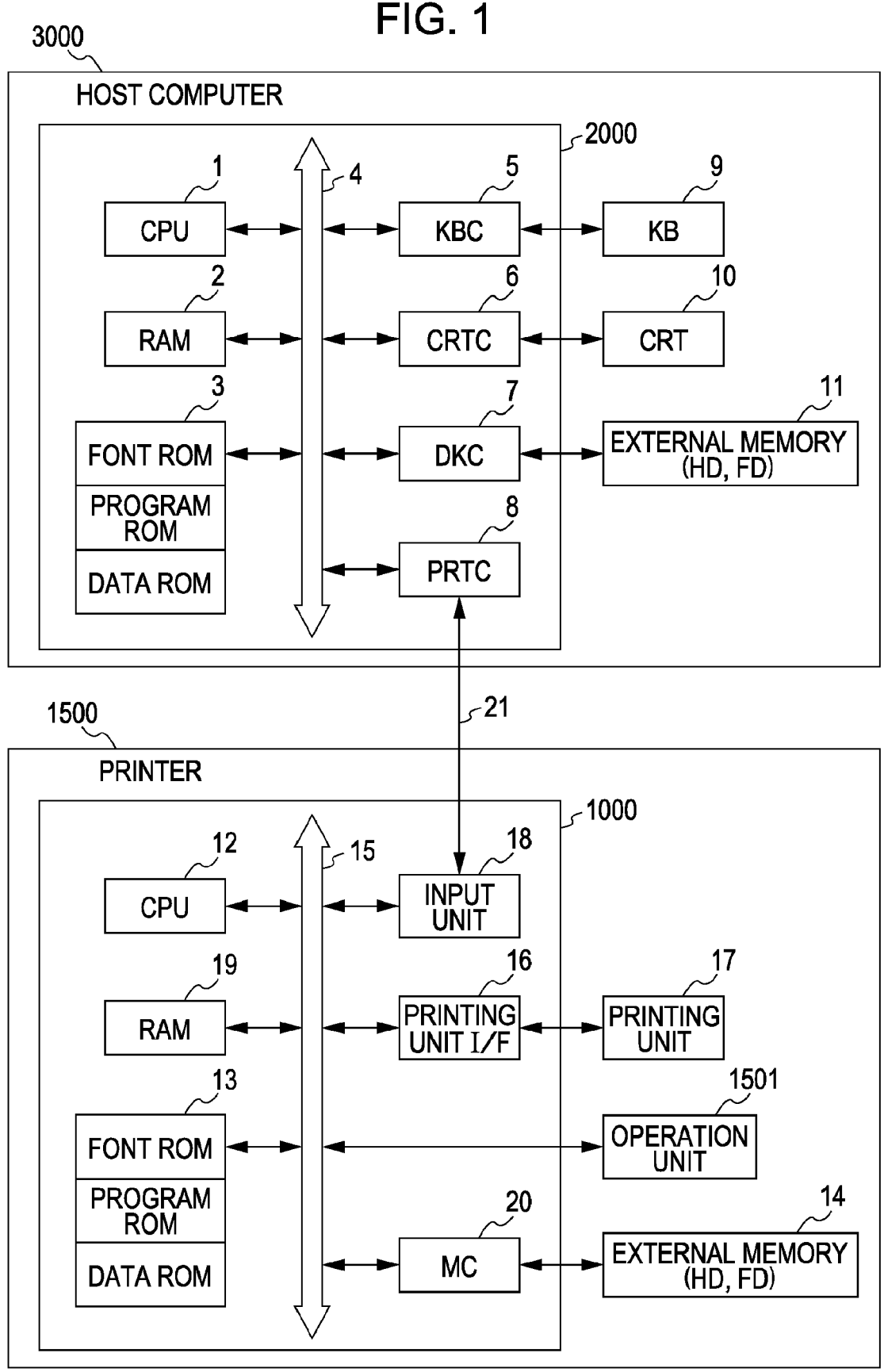
FIG. 1 is a block diagram showing a configuration of a printing system according to an embodiment of the present invention.

First, referring to FIG. 1, a configuration of a printing system according to an embodiment of the present invention is described. Note that the present invention may be applied not only to such a system shown in FIG. 1 but also to a single device or apparatus, a system including a plurality of devices or apparatus installed at the same location, or a system including a plurality of devices or apparatus which are installed at different locations and which are connected via a network such as a LAN or a WAN.

A computer 3000 includes a CPU 1 that performs various processes according to one of embodiments described below and also performs processes associated with producing and printing of a document, in accordance with programs stored in a program ROM area of a ROM 3 or stored in an external memory 11. The CPU 1 is responsible for general control of devices connected to a system bus 4. In the program ROM area of the ROM 3 or in the external memory 11, there is also stored an operating system (OS) as one of control programs according to which the CPU 1 operates. Data such as font data for use in processing of documents is stored in the font ROM area of the ROM 3 or in the external memory 11, and other various kinds of data used in processing of documents are stored in the data ROM area of the ROM 3 or in the external memory 11. A RAM 2 is used by the CPU 1 as a main memory or a work area.

A keyboard controller (KBC) 5 controls a key input operation of a keyboard (KB) 9 or a pointing device (not shown). A CRT controller (CRTC) 6 controls a displaying operation of a CRT display (CRT) 10. Note that displaying of a tint block image on the CRT display 10 is also controlled by the CRT controller 6.

A disk controller (DKC) 7 controls an access operation to the external memory 11 such as a hard disk (HD) or a floppy disk (FD).

In the external memory 11 such as the hard disk (HD) or the floppy disk (FD), are stored items such as a boot program, various kinds of application program, font data, user files, a file being edited, a printer control command generation program (hereinafter referred to as a printer driver), etc.

A printer controller (PRTC) 8, which is connected to a printer 1500 via a bidirectional interface 21, is responsible for control of communication with the printer 1500.

In accordance with commands issued by clicking icons or the like displayed on the CRT 10 with a mouse cursor or the like, the CPU 1 opens various kinds of windows and performs various kinds of data processing. When a printing operation is performed, a user is allowed to open a window for setting printing conditions and set the printer driver in terms of printing conditions including printer setting and the printing mode.

The printer 1500 is controlled by a CPU 12. In accordance with a control program stored in a ROM 13 or a control program stored in an external memory 14, the CPU 12 outputs an image signal as print output information to a printing unit (printer engine) 17 via a printing unit interface 16 connected to a system bus 15.

The ROM 13 includes a program ROM area in which a control program executed by the CPU 12 is stored. The ROM 13 also includes a font ROM area and a data ROM area. Font data for use in producing the print output information is stored in the font ROM area. When the printer used does not have a hard disk or the like serving as the external memory 14, information used by the computer is stored in the data ROM area of the ROM 13.

The CPU 12 is capable of communicating with the computer 3000 via an input unit 18. This allows it to transmit information from the printer to the computer 3000. A RAM 19 is used by the CPU 12 a main memory or a work area. The storage capacity of the RAM 19 may be extended by connecting an optional RAM to an extension port (not shown). The RAM 19 is also used as an output information rendering area, an environment data storage area, a NVRAM, etc.

Accessing to the above-described external memory 14 such as the hard disk (HD) or the IC card is controlled by a memory controller (MC) 20. The external memory 14 is optionally connected to store font data, an emulation program, form data, etc.

The printer 1500 may also include a NVRAM (not shown) to store printer mode setting information input via an operation unit 1501. The operation unit 1501 consists of switches, LED display unit, etc. for operation.

In the present embodiment, the printing unit 17 is an electrophotographic engine, which is capable of recording print data including a tint block image on a medium such as paper by forming toner dots on the medium. Note that the present invention is not limited to the electrophotographic engine, and other types of printing units may also be used. For example, the present invention may also be applied to any type of printing apparatus adapted to perform printing by forming dots, such as an ink-jet printer.

Figure 2:
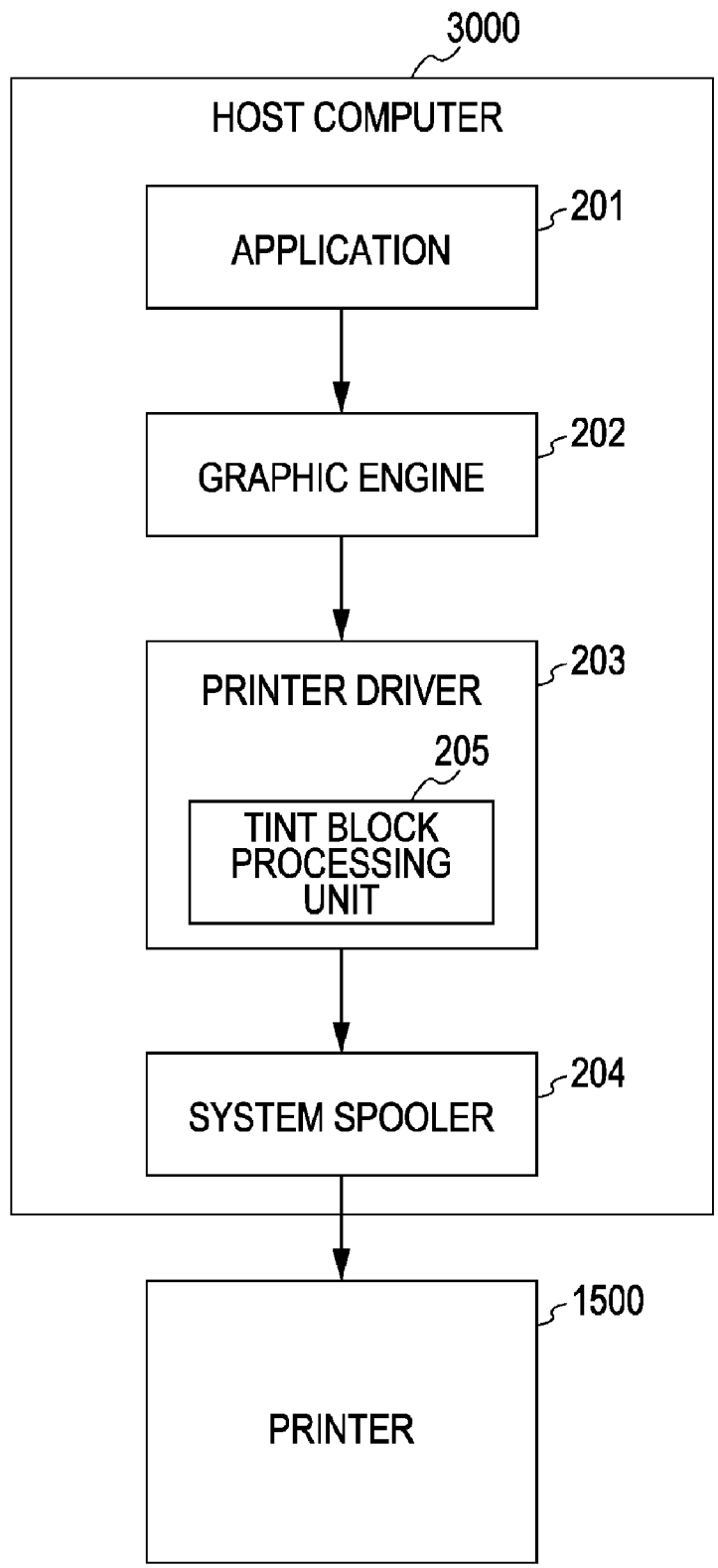
FIG. 2 shows an example of a configuration of a computer adapted to perform a printing process.

FIG. 2 shows an example of a configuration of the computer 3000 shown in FIG. 1 for performing a printing process. In FIG. 2, an application program 201, a graphic engine 202, a printer driver 203, and a system spooler 204 are program modules stored in the form of files in the external memory 11. These program modules are loaded by an operating system (OS) or a module using the OS from the external memory 11 into the RAM 2, and the program modules are executed by the CPU 1.

The application program 201 and the printer driver 203 may be stored in a floppy disk or a CD-ROM (not shown) serving as the external memory 11 or may be loaded into a hard disk or the like serving as the external memory 11 via a network (not shown).

The application 201 stored in the external memory 11 is loaded into the RAM 2 and executed. When the application 201 performs a printing process using the printer 1500, outputting (rendering) is performed using the graphic engine 202 which is also loaded in the RAM 2.

The graphic engine 202 loads one of printer drivers 203 prepared for respective printing apparatus (printers) from the external memory 11 into the RAM 2 and transfers data output from the application 201 to the printer driver 203. If the graphic engine 202 receives GDI (Graphic Device Interface) functions from the application 201, the graphic engine 202 converts the received GDI functions into DDI (Device Driver Interface) functions and outputs them to the printer driver 203. If the printer driver 203 receives the DDI functions from the graphic engine 202, the printer driver 203 converts the received DDI functions into control commands such as PDL (Page Description Language) commands which can be handled by the printer. The resultant printer control commands are output as print data to the printer 1500 via the system spooler loaded by the OS in the RAM 2 and further via the interface 21.

In the present embodiment, when given data includes a tint block to be printed in a superimposed mode, PDL data for printing a page and PDL data for printing the tint block are produced and output to the printer. The printer renders an image in a memory in accordance with the PDL data of the page and further renders an image thereon in accordance with the PDL data of the tint block. The resultant rendered image is printed by the print engine.

On the other hand, when given data includes a tint block to be printed in a watermark mode, PDL data for printing a page and PDL data for printing the tint block are produced and output to the printer. The printer renders an image in the memory in accordance with the PDL data of the tint block and further renders an image thereon in accordance with the PDL data of the page. The resultant rendered image is printed by the print engine.

In the present embodiment, the printing system includes a tint block processing unit 205 in the printer driver 203. The tint block processing unit 205 may be a build-in module of the printer driver 203 or may be a library module which is separately installed. When a tint block image is printed, the printer driver 203 performs processing including rendering of the tint block image by using the tint block processing unit 205.

Figure 3:
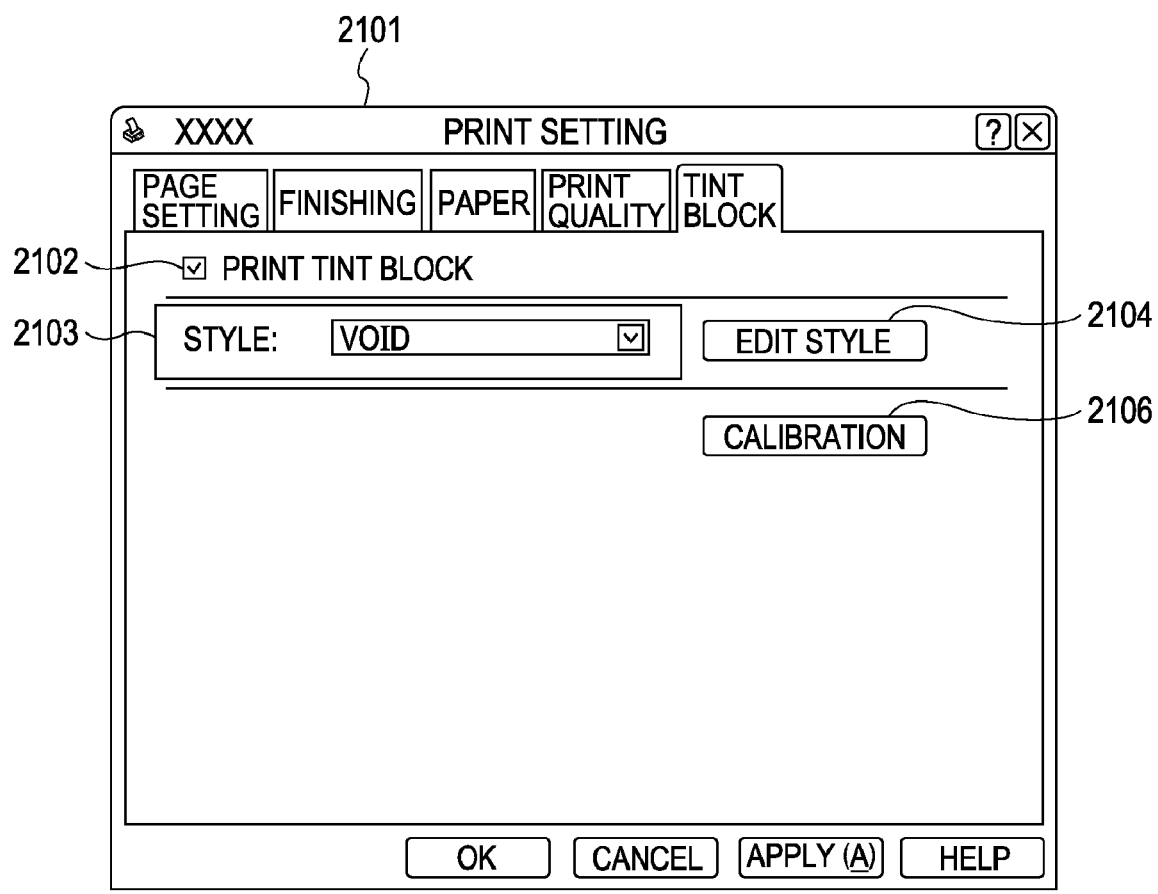
FIG. 3 shows an example of an initial screen of a user interface associated with tint block printing.
Figure 4A:
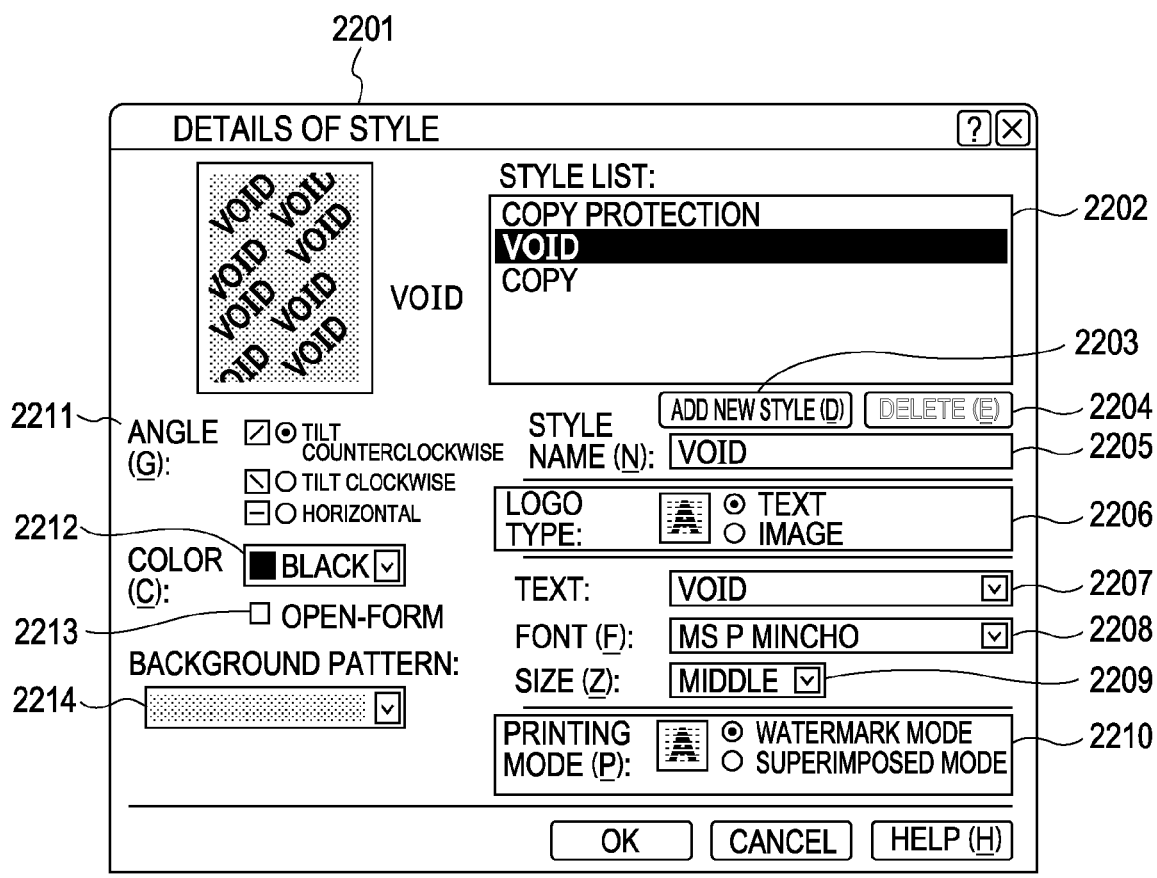
FIGS. 4A and 4B show examples of dialogs for specifying detailed settings associated with tint block printing.
Figure 4B:
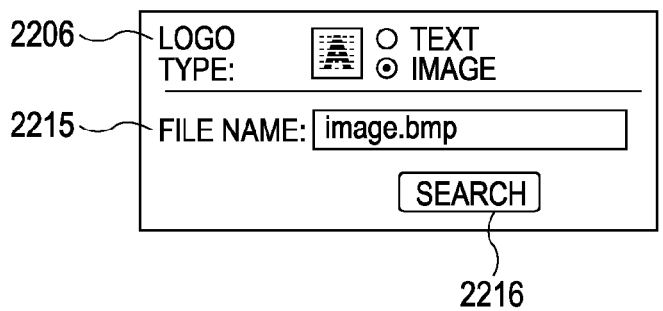

Now, a process of printing a tint block image is described. FIG. 3 and FIGS. 4A and 4B show examples of user interfaces that allow a user to perform setting in terms of printing of the tint block image.

FIG. 3 shows an example of an initial screen of a user interface associated with tint block printing provided by the printer driver 203. In this example, a property sheet 2101 is displayed which allows a user to make settings associated with tint block printing.

In FIG. 3, reference numeral 2102 denotes a check box for specifying whether a print job includes printing of a tint block image. The information specified via this check box 2102 as to whether the print job includes printing of a tint block image is stored as print property information indicating settings for given print data (document data). Reference numeral 2103 denotes a box for specifying a style of the tint block printing by selecting one of styles. The printer driver 203 provides a plurality of styles, one of which a user is allowed to select. The relationship between each style and information about printing of a corresponding tint block is registered in a registry. If a button 2104 is selected, a style edit dialog 2201 shown in FIG. 4A is displayed.

FIG. 4A shows an example of a dialog for specifying detailed settings associated with tint block printing.

In FIG. 4A, reference numeral 2201 denotes the entire style edit dialog in which a preview image of a tint produced according to particular tint block information (described later) is displayed. Reference numeral 2202 denotes a box in which a list of styles selectable in the box 2103 shown in FIG. 3 is displayed. A button 2203 is selected to add a new style. A button 2204 is selected to delete a specified style. Reference numeral 2205 denotes a box in which a name of a currently selected style is displayed.

A box 2206 includes radio buttons used to select a type of an object to be used in the tint block printing. For example, if a user selects "text" in the box 2206, a text object is specified. On the other hand, if a user selects "image" in the box 2206, image data such as bitmap data (BMP) is specified. In the example shown in FIG. 4A, "text" is selected and thus setting information associated with the text object is displayed in boxes 2207 to 2209 in the dialog 2201. The setting information specified in these boxes can be edited. On the other hand, in the case in which "image" is selected in the box 2206, boxes 2207 to 2209 are not displayed, but, as shown in FIG. 4B, an image file name box 2215 and a button 2216 are displayed. If the button 2216 is pressed, a file selection dialog is opened.

In the present embodiment, "text" and "image" are available as object types used in the tint block printing, and one of them is selected. However, in the present invention, the object types are not limited to these two. Furthermore, selection of object types is not limited to one at a time, but two or more object types may be used at the same time.

In the box 2207, a character string to be used as a tint block pattern is displayed. The character string displayed in this box 2207 is allowed to be edited. In the box 2208, a font selected for use for the character string is displayed. Although in the present embodiment, only a font name is selectable, the box 2208 may be extended so as to also allow it to select a font family (such as a bold font family, an italic font family, etc.) and/or a modified font.

In the box 2209, a font for use for the character string used as the tint block pattern is selectably displayed. In the present embodiment, a font size is selectable from three sizes: a "large" size, a "middle" size, and a "small" size. Alternatively, a point number or the like may be input to specify the font size.

In a box 2210, there are provided radio buttons for selecting an order of printing a tint block pattern and document data. When a "watermark mode" is selected, the tint block pattern is first rendered and then the document data is rendered. On the other hand, in the case in which a "superimposed mode" is selected, the document data is first rendered and then the tint block pattern is rendered. The rendering process will be described in detail later.

A radio button 2211 is used to specify an angle at which to place the tint block pattern. In the present embodiment, the angle is allowed to be selected from three alternatives: "tilt counterclockwise", "tile clockwise", and "horizontal". Instead, a numeric value may be input in an additional box to specify the angle, or the angle may be specified by using an additionally displayed slider bar.

A box 2212 is used to specify a color of the tint block pattern (the foreground pattern or the background pattern). A check box 2213 is used to specify whether the foreground pattern and the background pattern are exchanged from each other. When this check box is not checked, the tint block image is produced such that the foreground pattern will be visualized on a copied material, that is, such that the foreground pattern will be reproduced on the copied material. On the other hand, when the check box 2213 is checked, the tint block image is produced such that the background pattern will be visualized on a copied material, that is, such that the background pattern will be reproduced on the copied material. In this case, the text information or image information specified as the foreground pattern will be represented in an open form on the copied material.

A box 2214 is used to specify a camouflage image that makes it difficult for human eyes to perceive the tint block image on the original printed material. The camouflage image is selectable from a plurality of alternatives, including an alternative in which no camouflage image is used.

Now, referring to FIG. 5, a data format of print property information representing printing conditions (described above with reference to FIGS. 4A and 4B) of a tint block is described. In the present embodiment, the print property information described below is incorporated in a job output file which is information representing physical pages to be printed. Note that the format of the print property information is not limited to that described herein, but the print property information may be described in other formats.

In FIG. 5, in a field 2001, a value is stored which indicates the object type (text or image) drawn as the tint block, specified in the box 2206 shown in FIG. 4A. In a field 2002, information is stored which is specified in the boxes 2207 to 2209 shown in FIG. 4A or boxes shown in FIG. 4B and which indicates settings of the object specified by the value stored in the field 2001. When text is selected as the object type, information indicating a character string, a font name, and a font size is stored in this field 2002. On the other hand, when an image is selected as the object type, information indicating the location of an image file to be used is stored in the field 2002.

In a field 2003, information is stored which is specified in the box 2210 shown in FIG. 4A and which indicates whether the tint block pattern is first rendered before the document data is rendered or the document data is first rendered and then the tint block pattern is rendered.

In a field 2004, information is stored which is specified in the box 2211 shown in FIG. 4A and which indicates the angle at which the object should be drawn. In a field 2005, information is stored which is specified in the box 2212 shown in FIG. 4A and which indicates the color of the tint block pattern (the foreground pattern or the background pattern).

In a field 2006, information is stored which is specified in the check box 2213 shown in FIG. 4A and which indicates how to deal with the foreground pattern and the background pattern. In a field 2007, information is stored which is specified in the box 2214 shown in FIG. 4A and which indicates a pattern specified as the camouflage image.

In a field 2008, intensity information of the foreground pattern is stored. In a field 2009, intensity information of the background pattern is stored.

A process of rendering a tint block pattern is described below.

Figure 6:
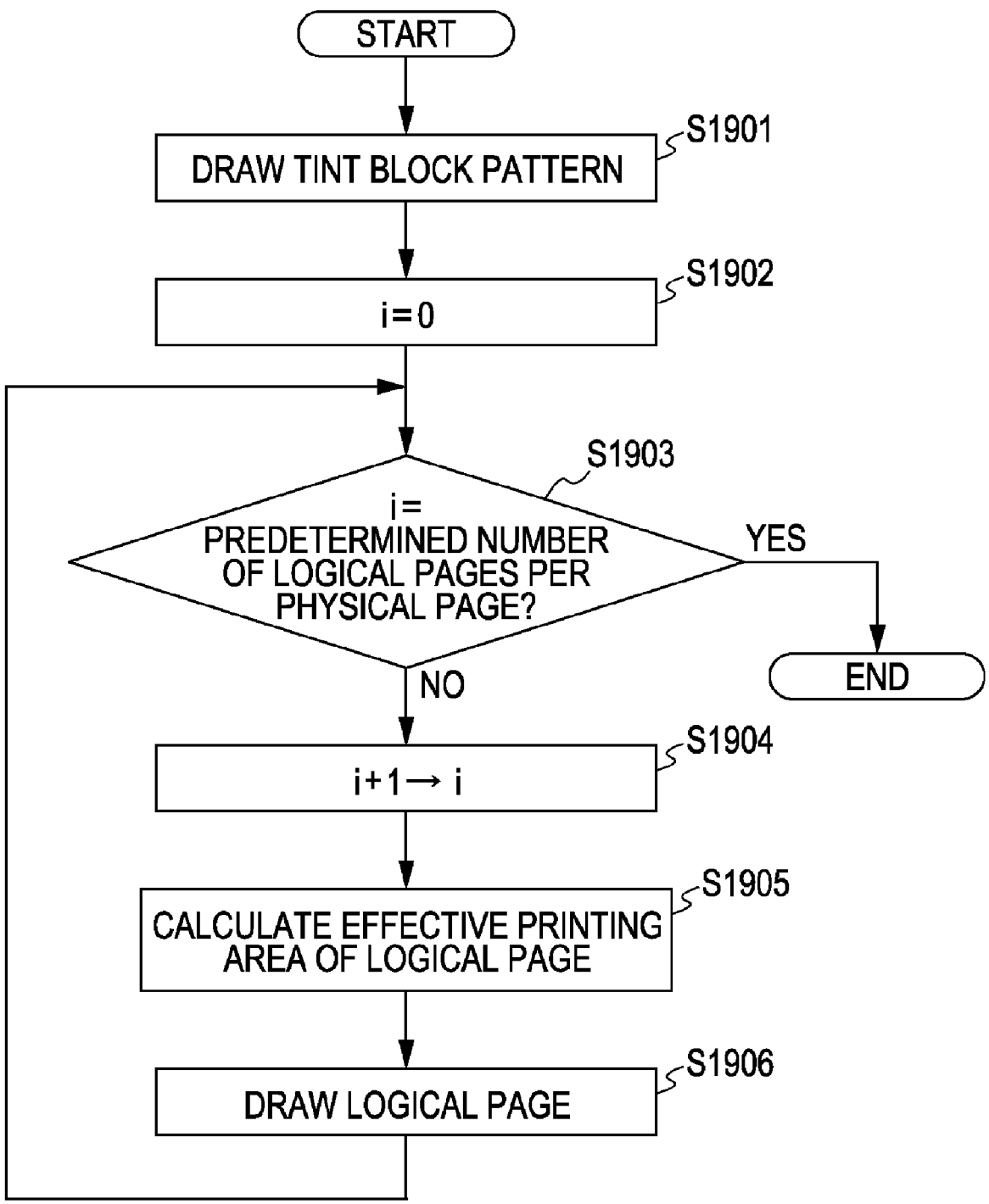
FIG. 6 is a flow chart showing a rendering process in a watermark printing mode.
Figure 7:
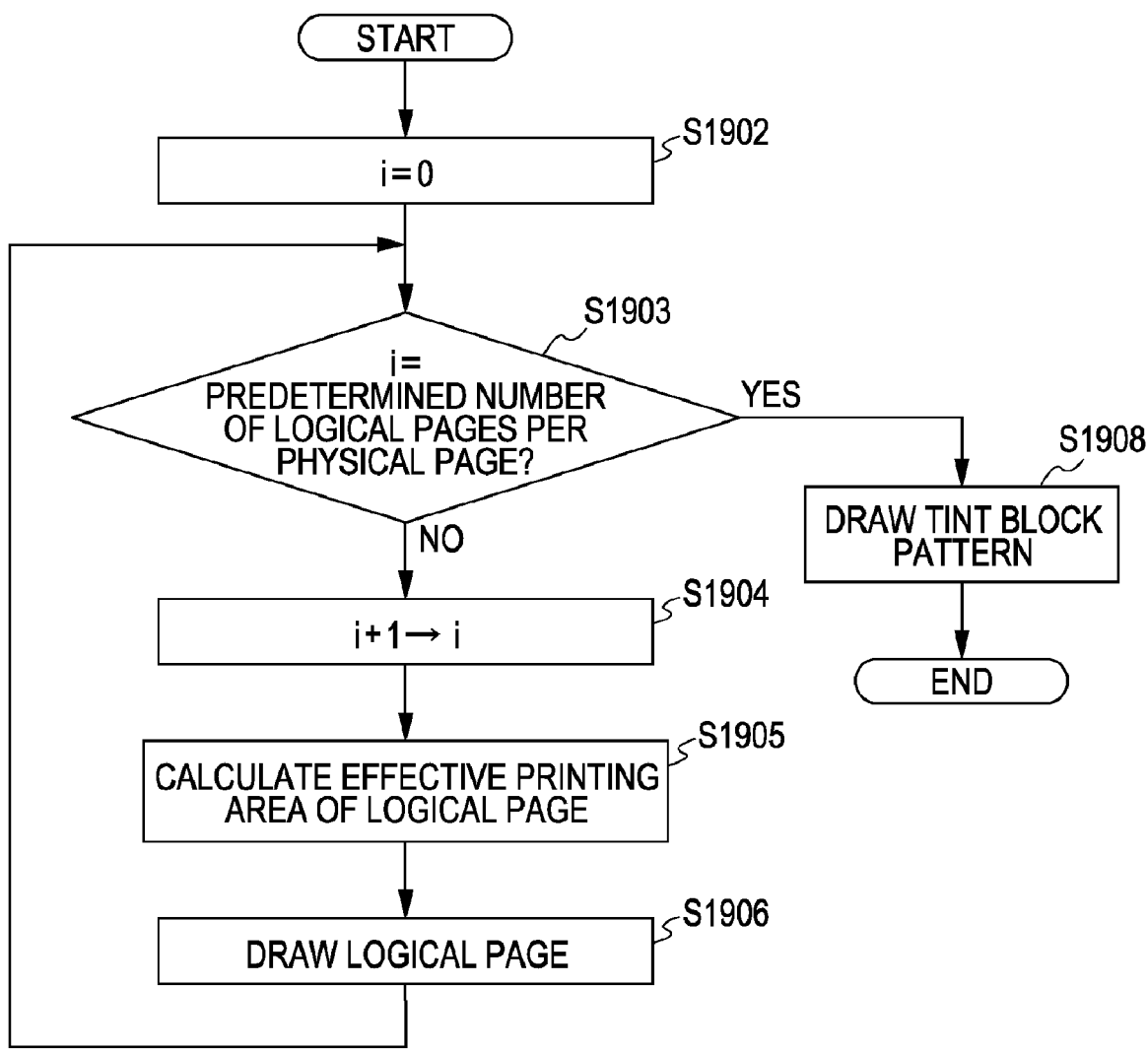
FIG. 7 is a flow chart showing a rendering process in a superimposed printing mode.

FIGS. 6 and 7 are flow charts showing rendering processes in the tint block printing. The printer driver program (the tint block processing program) associated with these flow charts are read from the hard disk 11 into the RAM 2 and executed by the CPU 1. When printing is performed in the watermark mode, rendering is performed according to the flow chart shown in FIG. 6. On the other hand, when printing is performed in the superimposed mode, rendering is performed according to the flow chart shown in FIG. 7. The rendering process described herein is performed in a printing process using the printer driver under the control of the CPU 1. In FIGS. 6 and 7, similar steps are denoted by similar step numbers.

First, referring to the flow chart shown in FIG. 6, the rendering process in the watermark mode is described. In this mode, the tint block pattern is first rendered before the document data is rendered.

In step S1901, a tint block pattern is produced in accordance with the tint block pattern information shown in FIG. 5. The produced tint block pattern is converted into PDL data including information indicating a position at which to draw the tint block pattern. This process will be described in further detail later with reference to FIG. 18. Thereafter, rendering of the document data is performed. Next, in step S1902, the CPU 1 initializes a counter that counts the number of logical pages of each physical page (corresponding to one paper page).

Then, in step S1903, the CPU 1 determines whether the counter value is equal to the predetermined maximum allowable number of pages per physical page. If the determination is that the counter value is equal to the predetermined maximum allowable number of pages per physical page, then the process ends, otherwise the process proceeds to step S1904.

In step S1904, the CPU 1 increments the counter by 1. In step S1905, in accordance with the number of pages per physical page and the counter value, the CPU 1 calculates the effective printing area in which to draw the current logical page. In step S1906, the CPU 1 reads the current logical page number from the print property information (not shown) associated with the physical page, by using the counter value as an index. The CPU 1 renders the present logical page in the PDL format so as to be represented within the effective printing area. If necessary to be represented within the effective printing area, scaling down is performed.

The rendering process in the watermark mode has been described above.

Now, referring to the flow chart shown in FIG. 7, the rendering process in the superimposed mode is described, in which the document data is first rendered and then the tint block pattern is rendered.

In step 1902, the CPU 1 initializes a counter that counts the number of logical pages of each physical page (corresponding to one paper page).

Next, in step S1903, the CPU 1 determines whether the counter value is equal to the predetermined maximum allowable number of pages per physical page. If the determination is that the counter value is equal to the predetermined maximum allowable number of pages per physical page, then the process proceeds to step S1908, otherwise the process proceeds to step S1904.

In step S1904, the CPU 1 increments the counter by 1. In step S1905, in accordance with the number of pages per physical page and the counter value, the CPU 1 calculates the effective printing area in which to draw the current logical page. In step S1906, the CPU 1 reads the current logical page number from the print property information (not shown) associated with the physical page, by using the counter value as an index. The CPU 1 renders the present logical page in the PDL format so as to be represented within the effective printing area. If necessary to be represented within the effective printing area, scaling down is performed.

If rendering of the predetermined number of logical pages for a particular physical page is completed, the process proceeds to step S1908. In step S1908, the CPU 1 produces a tint block pattern in the effective printing area of the physical page specified by the application in accordance with the tint block pattern information shown in FIG. 5. The produced tint block pattern is converted into PDL data including position information at which to draw the tint block pattern. The details of this process will be described later with reference to FIG. 18.

Figure 12:
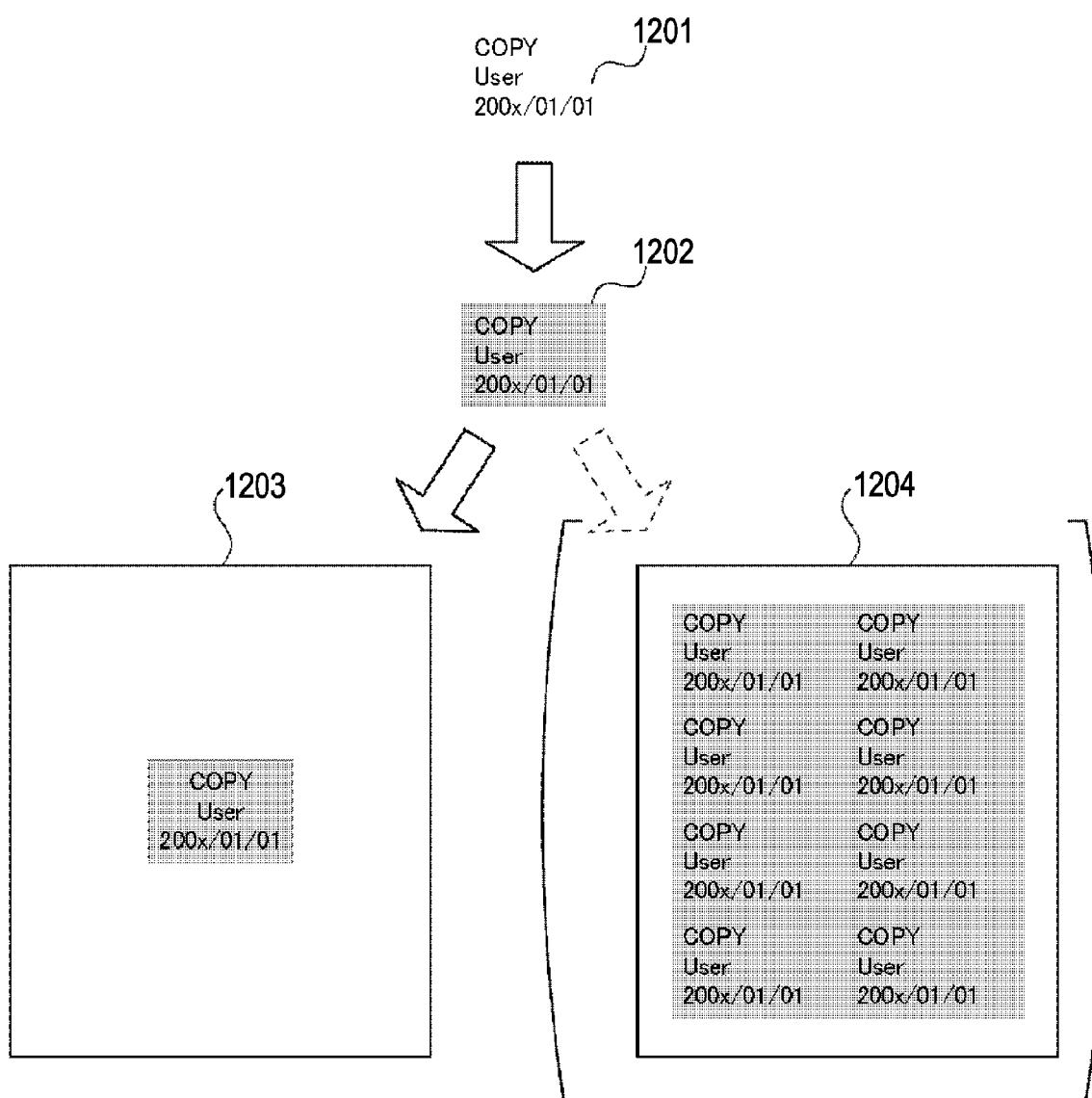
FIG. 12 shows two tint block drawing modes according to an embodiment of the present invention.

Two tint block drawing modes, that is, a whole area mode and a partial area mode are described below with reference to FIG. 12.

A tint block pattern is produced so as to include a latent character string 1201 according to specified properties in terms of the font, the printing angle, the color of the tint block, the camouflage pattern, etc. More specifically, a unit pattern 1202 including the latent character string 1201 is produced according to the specified properties. Hereinafter, this pattern unit 1202 will be referred to as a tint block tile. Note that the tint block tile 1202 may include a repetition of the latent character string.

The tint block tile 1202 is then placed on a page in one of the two modes as described below. In the whole area mode, the tint block tile is placed periodically across the entire area of a page, as denoted by reference numeral 1204 in FIG. 12. In the partial area mode (1203 in FIG. 12), only a single tint block tile is placed at a particular position on a page.

The partial area mode 1203 and the whole area mode 1204 are switchable.

The size of the tint block tile is determined based on the font size of the latent character string. The size of the tint block tile is defined as the size obtained by adding line spaces and margins to a bounding box.

In the partial area mode, the maximum allowable size of the single tint block tile is limited to a particular value relative to the page area. For example, the maximum allowable area is limited to 16% of the total page area in order to limit the consumption of resources such as toner or memory.

Figure 13:
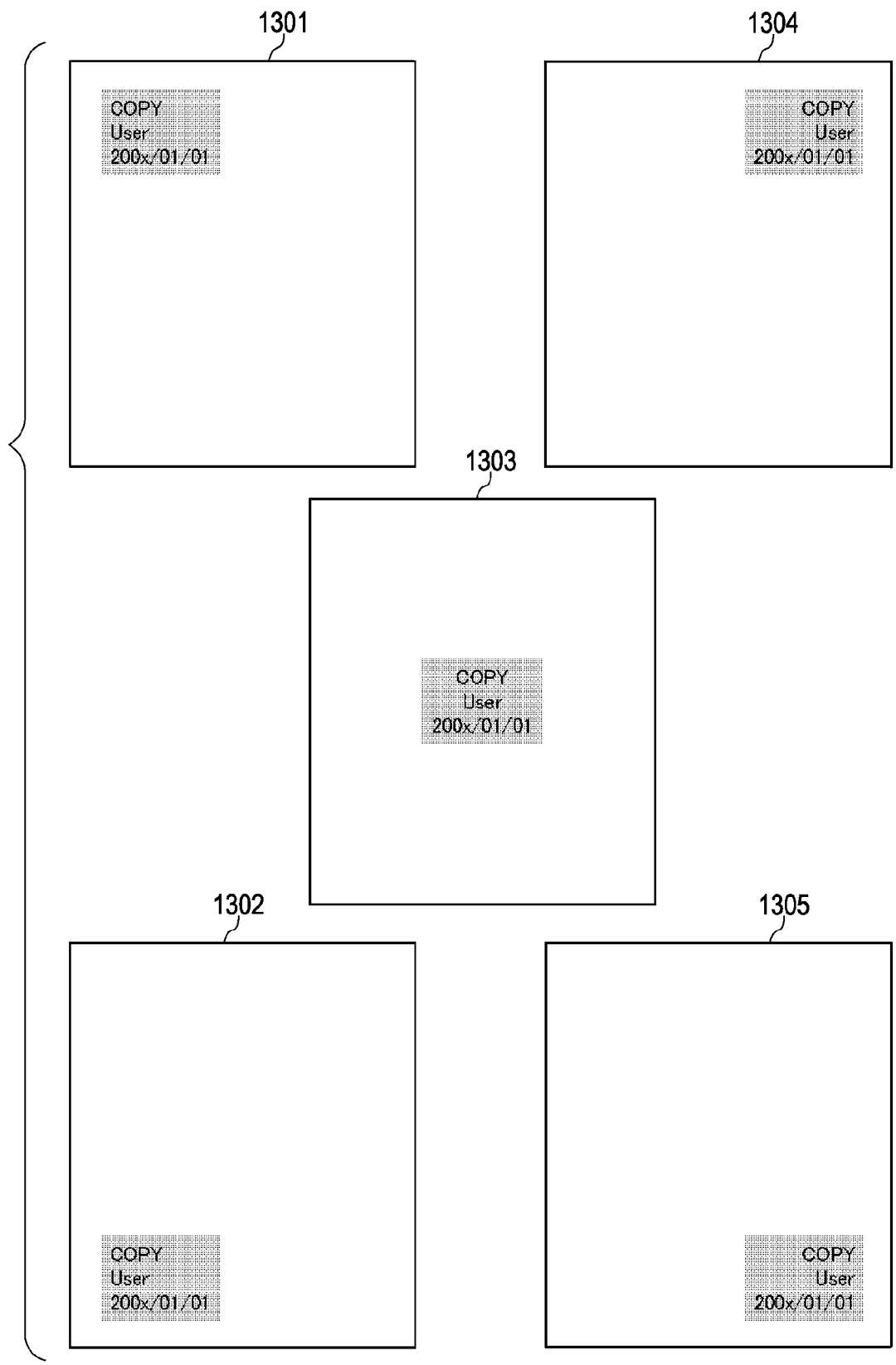
FIG. 13 shows examples of manners in which a tint block is placed at a particular position and latent character strings are justified.

Now, referring to FIG. 13, arrangement of tint blocks and justification of latent character strings are described.

When a single tint block is placed in the partial area mode, the position thereof is selectable from five positions: "center", "upper left", "upper right", "lower left", and "lower right", as denoted by reference numerals 1301 to 1305 in FIG. 13.

The justification of the latent character string in the tint block tile is automatically controlled according to the position at which the single tint block is placed as follows. When the single tint block is placed at the center position 1303, the latent character string is automatically center justified. When the single tint block is placed at the upper left position 1301 or the lower left position 1302, the latent character string is automatically left justified. When the single tint block is placed at the upper right position 1304 or the lower right position 1305, the latent character string is automatically right justified.

Figure 14:
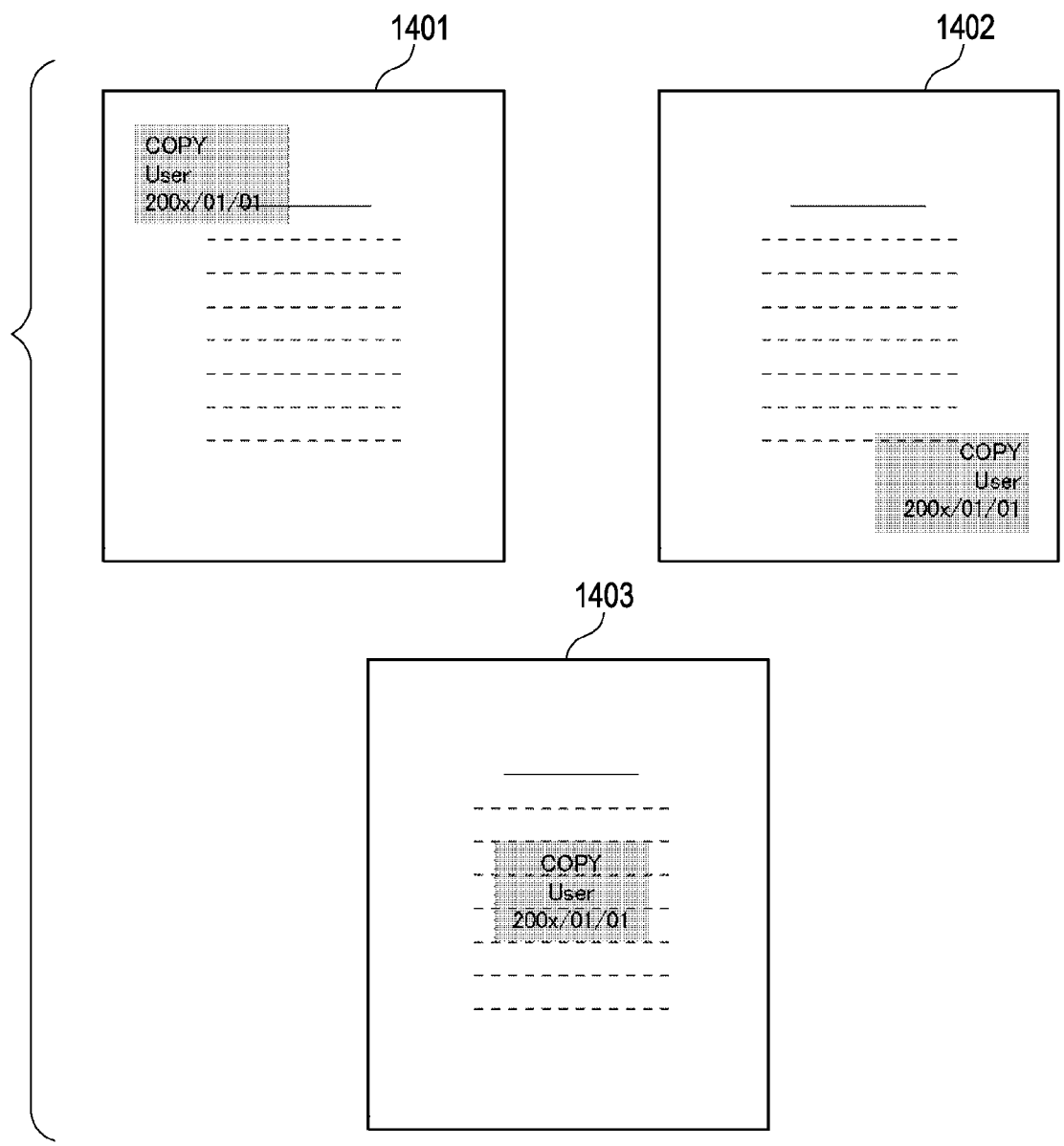
FIG. 14 shows examples of manners in which a tint block is placed at a particular position and latent character strings are justified.

The control of the justification is described further with reference to FIG. 14. Of the five positions described above, the upper left position 1401, the center position 1403, and the lower right position 1402 are discussed below.

In general, document text is written in a central area of a page. When it is desirable that the latent character string be visualized on a copied material without overlapping the text area of the document, the single tint block tile is specified to be placed at the upper left position 1401 or the lower right position 1402. This makes it possible for the latent character string to appear so as to have no overlap with the document text area when it is visualized on a copied material. This allows a user to recognize both the visualized latent character string and the document text.

When the single tint block tile is specified by a user to be placed at the upper left position or the lower right position, the latent character string is automatically justified with respect to a closer end of the page with a particular margin when it is visualized on a copied material. More specifically, when the single tint block tile is placed at the upper left position 1401, the latent character string is left justified. On the other hand, when the single tint block tile is placed at the lower right position 1402, the latent character string is right justified. This makes it easier to place the latent character string without overlapping the document text area.

To intentionally specify that the latent character string will appear on a copied material at a position overlapping the document text area, the single tint block tile is placed at the center position 1403. When the document data includes important or confidential information, if the single tint block tile is placed at the center position 1403, then the document information on a copied material will be partially hidden behind the visualized latent character string, and thus it is possible to prevent the document information from being perfectly copied. When the single tint block tile is specified by a user so as to be placed at the center position, the latent character string is automatically center justified.

This ensures that the latent character string visualized on a copied material will appear on the document information in an overlapping manner. This more effectively prevents the document information from being copied. For the above-described reason, the latent mark area is center justified when the single tint block tile is specified to be placed at the center position 1403.

Now, an operation screen is described in detail with reference to an example shown in FIG. 15.

In a "printing area" box 1504 on a dialog screen 1501, it is allowed to specify whether a tint block should be drawn over the entire area or in a partial area of a page by checking a "whole" radio button or a "partial" radio button. In a case in which a device used allows only a single tint block tile because of a limitation on a resource, the "partial" radio button is automatically selected, and the "whole" radio button is disabled (the "whole" radio button may be displayed in a gray color to indicate that this button is disabled).

When the "partial" radio button in the "printing area" box 1504 of the dialog screen 1501, a combo box 1512 for specifying the position at which to place a single tint block tile becomes enabled whereby a user is allowed to select the position of the single tint block tile from a list including a "center" position, a "upper left" position, a "upper right" position, a "lower left" position and a "lower right" position. In the specific example shown in the middle of FIG. 15, the "center" position is selected in the combo box 1512, and a preview image is displayed in a box 1513. In this example, the preview image indicates that the single tint block tile is placed at the center, and the latent character string is center justified. On the other hand, if the "upper left" position is selected in the combo box 1522, and a preview image displayed in the box 1523 indicates that the single tint block tile is placed at the upper left position and the latent character string is left justified.

Now, automatic adjustment of the size is explained.

As described above, the size of the tint block tile is determined in accordance with the font size of the latent character string and the size of the single tint block tile is adjusted within the predetermined range. The control of the size of the tint block tile is discussed in further detail below.

Figure 16:
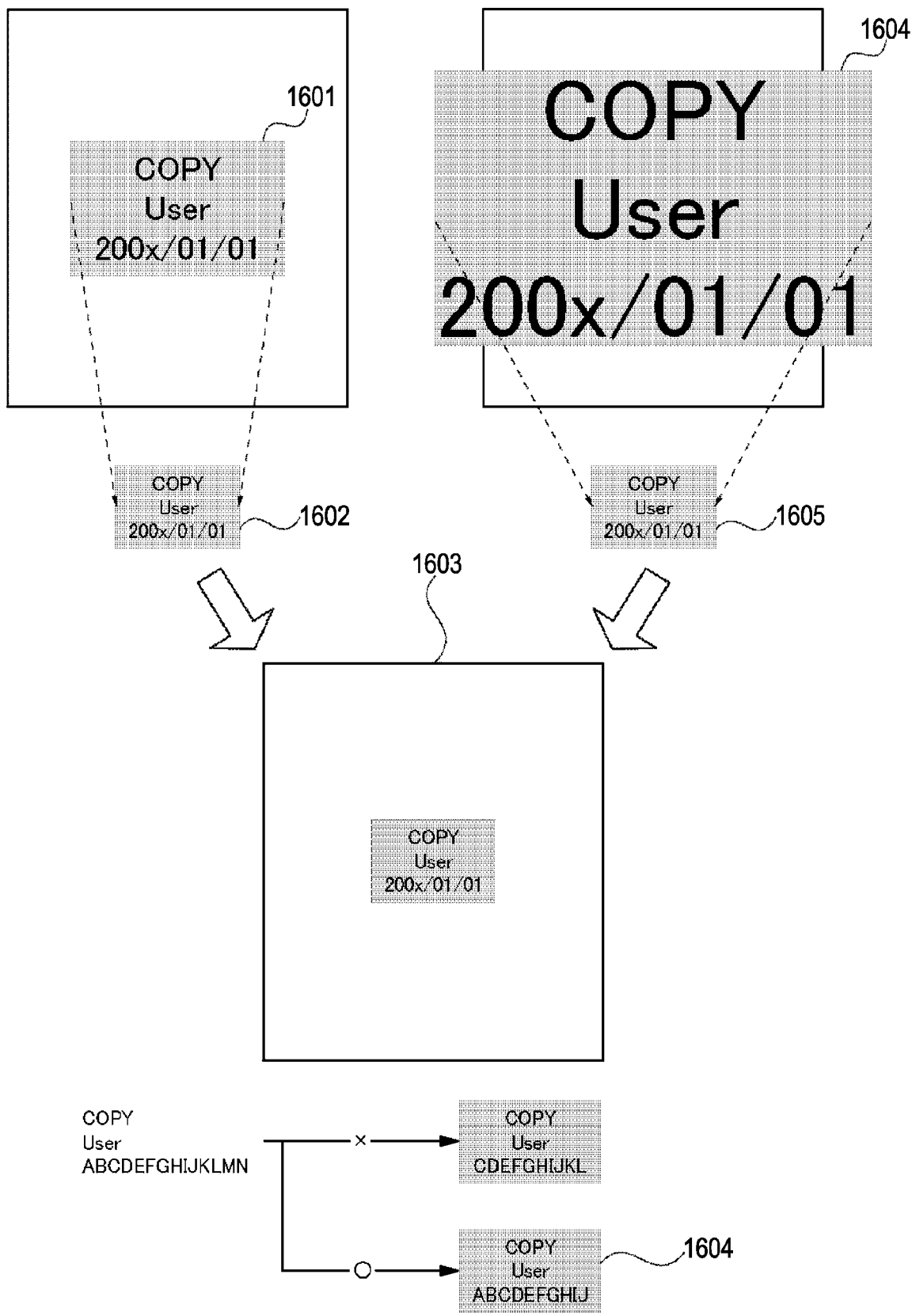
FIG. 16 shows examples of automatic size adjustments.

FIG. 16 shows an example of a manner in which the size of a tint block tile is automatically adjusted.

In the following cases, the computer controls the font size such that the font size is reduced to adjust the size of the tint block tile. However, because the font size should not be too small to be readable when the tint block is visualized, the lower limit of the font size is defined. In the present embodiment, for example, the lower limit of the font size is set to 24 points.

In a case in which the tile area is greater than the upper limit (as denoted by reference numeral 1601), the font size is reduced until the tile area becomes smaller than the upper limit. When the font size that allows the tile area to be smaller than the upper limit is determined in this way, the tile 1602 is produced in the determined font size, and printing is performed as denoted by reference numeral 1603.

In a case in which the tile area does not become smaller than the upper limit even if the font size is reduced to the lower limit, the tile 1602 with an area equal to the upper limit is produced in the minimum allowable font size. Characters overflowed from the area are discarded.

In a case in which the width or the height of the tile is greater than the page size as denoted by reference numeral 1604, the font size is reduced until the width of the height of the tile becomes smaller than the page size. When the font size that allows the tile area to be smaller than the upper limit is determined in this way, the tile 1605 is produced in the determined font size, and printing is performed as denoted by reference numeral 1603.

In a case in which the tile area does not become smaller than the page size even if the font size is reduced to the lower limit, the tile 1605 with an area smaller than the page size and equal to the upper limit is produced in the minimum allowable font size. Characters overflowed from the area are discarded.

In a case in which the font size is set to the lower limit as a result of the automatic adjustment and an overflow of characters occurs, the latent character string may be automatically left justified. Although the latent character string is automatically justified depending on the position of the tint block tile as described above, rows in which an overflow occurs are specially controlled such that character strings are left justified so that overflowed characters in right end portions of rows are discarded.

Figure 17:
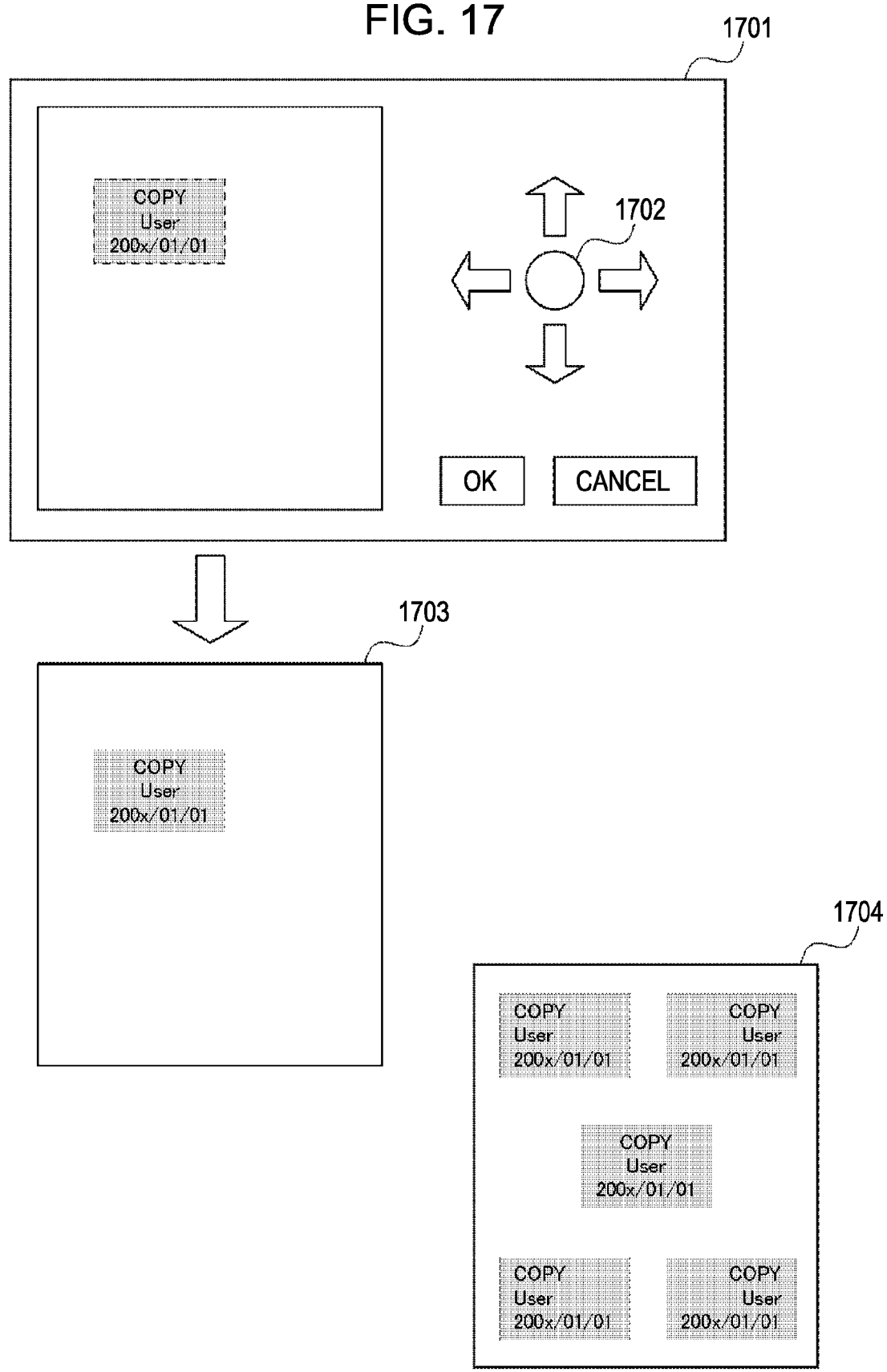
FIG. 17 shows examples of manners in which a tint block is placed at particular one or more positions.

Now, referring to FIG. 17, further examples of manners in which a single tint block tile is placed at one or more positions are described.

As shown in FIG. 17, arrow buttons 1702 for controlling directions may be disposed on the operation unit 1701. By using the arrow buttons 1702, a tint block tile is allowed to be placed at an arbitrary position. In this case, in accordance with a predefined rule, a latent character string is center, left, or right justified depending on an area of a page where the tint block tile is placed.

Instead of placing the tint block tile at a position selected from the predetermined five positions in the above-described examples, the tint block tile may be placed at all five positions as in an example 1704 shown in FIG. 17.

Next, a processing flow is explained with reference to a flow chart shown in FIG. 18. This process is performed by the CPU 1 by executing the printer driver program (the tint block processing program) loaded from the hard disk 11 of the host computer into the RAM 2.

Figure 18:
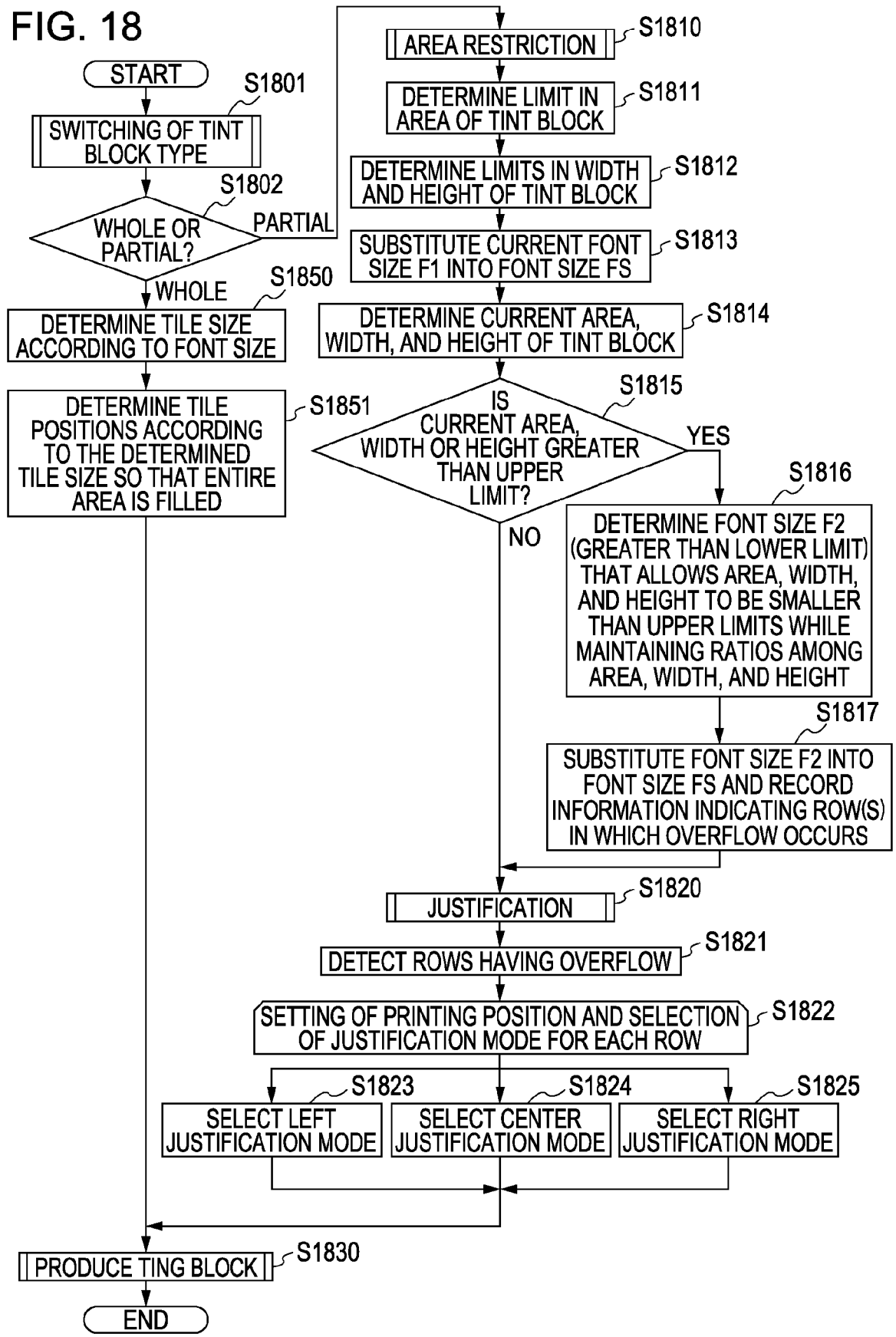
FIG. 18 is a flow chart showing a tint block pattern drawing process according to an embodiment of the present invention.

In this flow chart shown in FIG. 18, the details of the tint block pattern drawing process in step S1901 in FIG. 6 or step S1908 in FIG. 7 are described.

In step S1801, the tint block type is switched. If it is determined in step S1802 that the partial area mode is selected, the process proceeds to step S1810.

In a sequence of steps from S1810, the area of the tint block is defined. In step S1811, the upper limit of tint block size is determined. In step S1812, the limit in width and height of the tint block is determined. In step S1813, a specified font size F1 is read. In step S1814, the current area, the width, and the height of the tint block are determined. In step S1815, it is determined whether the current area, the width, and the height of the tint block are smaller than the upper limits (whether the current area, the width, and the height of the tint block are greater than the upper limits). If the current area, the width, and height of the tint block are smaller than the upper limits (the answer in step S1815 is no), the process proceeds to step S1820 described below. If the current area, the width, and the height of the tint block are greater than the upper limits (the answer in step S1815 is yes), the process proceeds to step S1816. In step S1816, the font size F2 is determined such that the size of the tint block is equal to or smaller than the upper limit. Note that the font size F2 is determined so as not to be smaller than the predetermined lower limit. In step S1817, the font size is set to be equal to the font size F2 determined in step S1816. If an overflow of characters occurs in a particular row even when the font size is set to the lower limit, the row having the overflow is marked.

In a sequence of steps from S1820, a justification mode in which to justify the latent character string is selected.

In step S1821, it is determined whether an overflow of characters occurs for each row. In step S1822, The justification mode is set to the left justification mode (step S1823), the center justification mode (step S1824), or the right justification mode (step S1825).

According to the parameters (in terms of the font size and the justification mode) determined in the previous steps, a single tint block pattern (a tint block tile) is produced in step S1830. The produced single tint block pattern is converted into PDL data including information indicating a position at which to draw the single tint block pattern. The details of the process of producing the tint block pattern are shown in FIG. 8.

Returning to step S1802, in a case in which it is determined that the whole area mode is selected, the process proceeds to step S1850. In step 1850, as in step S1202 in FIG. 12, the size of the tint block tile is determined according to the font size specified by manipulating the box 2208 in FIG. 4A. In step 1851, as the example 1204 in FIG. 12, the tint block tile is arranged in the form of an array according to the determined size of the tint block tile such that the whole area is filled with tint block tiles According to the parameters (in terms of the font size and the arrangement positions) determined in the previous steps, an array-of-tint-blocks pattern is produced in step S1830. The produced array-of-tint-blocks pattern is converted into PDL data including information indicating a position from which to draw the array-of-tint-blocks pattern. The details of the process of producing the tint block pattern are shown in FIG. 8.

Figure 8:
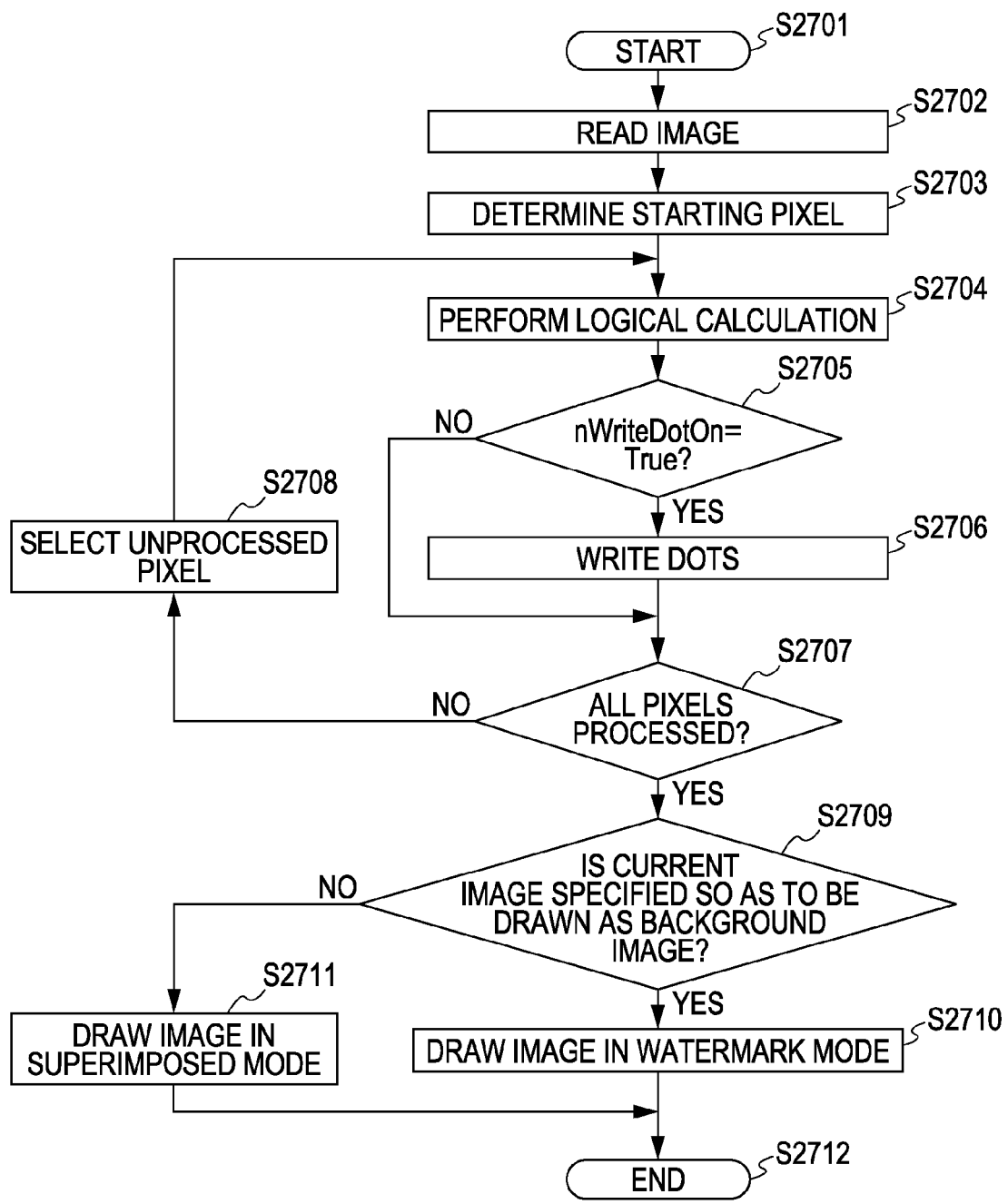
FIG. 8 is a flow chart showing the details of a process of rendering a tint block pattern.

FIG. 8 is a flow chart showing the details of the tint block generation process in step S1830 in FIG. 18 according to an embodiment of the present invention. Note that the process shown in this flow chart is performed by the CPU 1 by executing the printer driver program (the tint block processing program) loaded from the hard disk 11 into the RAM 2. Referring to FIG. 8, the tint block pattern drawing process is explained. Note that in the whole area mode, the process shown in FIG. 8 is performed repeatedly as many times as required according to the tile placement position information such that the tint block pattern is drawn at each position.

In step S2701, if a start command is issued via the user interface, the tint block pattern drawing process is started. In step S2702, the CPU 1 acquires various kinds of information necessary in the drawing of the tint block tile, such as an input background image, a background threshold pattern, a foreground threshold pattern, a foreground/background area defining image, a camouflage area defining image, a font size and a justification mode for the foreground image, a size of the tint block tile, and information associated with the tint block tile arrangement. In step S2703, the CPU 1 determines the starting pixel at which to start drawing of the tint block pattern image. For example, in a case in which the tilt block image is formed by performing raster scanning from the upper left corner to the lower right corner, a pixel in the upper left corner is selected as the starting pixel.

In the next step S2704, the CPU 1 places the background threshold pattern, the foreground threshold pattern, the foreground/background area defining image, and the camouflage image on a tile starting from the starting pixel of the input background image. For a pixel of interest of the input background image, the CPU 1 performs calculation according to formula (1) described below.

$$n\text{WriteDotOn}=$$
$$n\text{camouflage} \times (n\text{SmallDotOn} \times \neg n\text{HiddenMark} + n\text{LargeDotOn} \times n\text{HiddenMark}) \quad (1)$$

According to the calculation result, the CPU 1 determines whether to write pixel values corresponding to dots of a printed material into a memory area. Note that the pixel values represent colors at respective pixels.

Note that the background threshold pattern and the foreground threshold pattern are pattern data consisting of "1"s indicating that writing of corresponding dots should be performed and "0"s indicating that writing of corresponding dots should not be performed. These pattern data are represented in the form of dither matrices indicating the dot positions of the foreground image (latent image) and the background image.

Terms in equation (1) are explained below. nComouflage takes a value of 0 when in the camouflage area defining image, a pixel of interest is a pixel of the camouflage area, or otherwise takes a value of 1. nSmallDotOn takes a value of 1 when a pixel of interest of the background threshold pattern is black but takes a value of 0 when the pixel of interest is white (note that the color is not limited to white). nLargeDotOn takes a value of 1 when a pixel of interest of the foreground threshold pattern is black but takes a value of 0 when the pixel of interest is white (note that the color is not limited to white). $\neg n$HiddenMark takes a value of 1 when in the foreground/background area defining image, a pixel of interest is a pixel of the latent mark area, but takes a value of 0 when the pixel of interest is a pixel of the background area. nHiddenMark is an inversion of $\neg n$HiddenMark, that is, nHiddenMark takes a value of 0 in the foreground area and a value of 1 in the background area.

Note that the calculation for a pixel of interest does not necessarily need to be performed for all terms in equation (1), and unnecessary calculation may be omitted. This allows an increase in the processing speed.

For example, if nHiddenMark=1, then $\neg n$HiddenMark=0. If nHiddenMark=0, then $\neg n$Hiddenmark=1. Therefore, if nHiddenMark=1, then the value given by formula (2) described below can be employed as the value of nLargeDotOn. On the other hand, if nHiddenMark=0, then the value given by formula (2) can be employed as the value of nSmallDotOn. Note that because formula (1) is in the form of the product of nCamouflage and the other term, if nCamouflage=0 then nWriteDotOn=0, and thus the calculation of formula (2) may be omitted when nCamouflage=0.

$$(n\text{SmallDotOn} \times \neg n\text{HiddenMark} + n\text{LargeDotOn} \times n\text{HiddenMark}) \quad (2)$$

In the production of the tint block image, the unit pattern size which is drawn periodically is given by the least common multiple of the sizes of the background threshold pattern, the foreground threshold pattern, the foreground/background area defining image, and the camouflage area defining image in each of vertical and horizontal directions. Therefore, the tint block pattern drawing unit produces only the unit pattern and produces the total tint block image by placing the unit pattern periodically in the form of an array of tiles. This allows a reduction in the processing time spent to produce the tint block image.

In step S2705, the CPU 1 checks the result of the calculation of the value of nWriteDoton performed in step S2704. If nWriteDotOn=1, the process proceeds to step S2706. If nWriteDotOn=0, the process proceeds to step S2707.

In step S2706, the CPU 1 sets the pixel values of dots to be printed. The pixel values may be varied depending on the color of the tint block image. For example, when a black tint block is to be formed, the pixel values of corresponding dots of the tint block image are set to a value corresponding to the black level. In a case in which a tint block is to be formed in another specified color, the pixel values are set to a value corresponding to cyan, magenta, or yellow so as to obtain the specified color taking into account the toner or ink colors available on the printer used. In a case in which each pixel of image data is expressed using one to several bits, the pixel value may be expressed using index color.

More specifically, colors which appear frequently in the color image are expressed by indexes. For example, white is expressed by index 0, cyan is expressed by index 1, and so on. According to the above definition of the color indexes, the pixel values of the respective pixels are expressed by index numbers. For example, the pixel value of a first pixel is expressed by index 1, the pixel value of a second pixel is expressed by index 2, and so on. In step S2707, the CPU 1 determines whether the process is completed for all pixels in the area of interest. If the process is not completed for all pixels in the area of interest, the process proceeds to step S2708. In step S2708, an unprocessed pixel is selected, and the selected pixel is processed by again performing steps 2704 to S2706. On the other hand, if the process is completed for all pixels in the area of interest, the process proceeds to step S2709, where a determination is made whether the current image is specified to be drawn as a background image.

Figure 9:
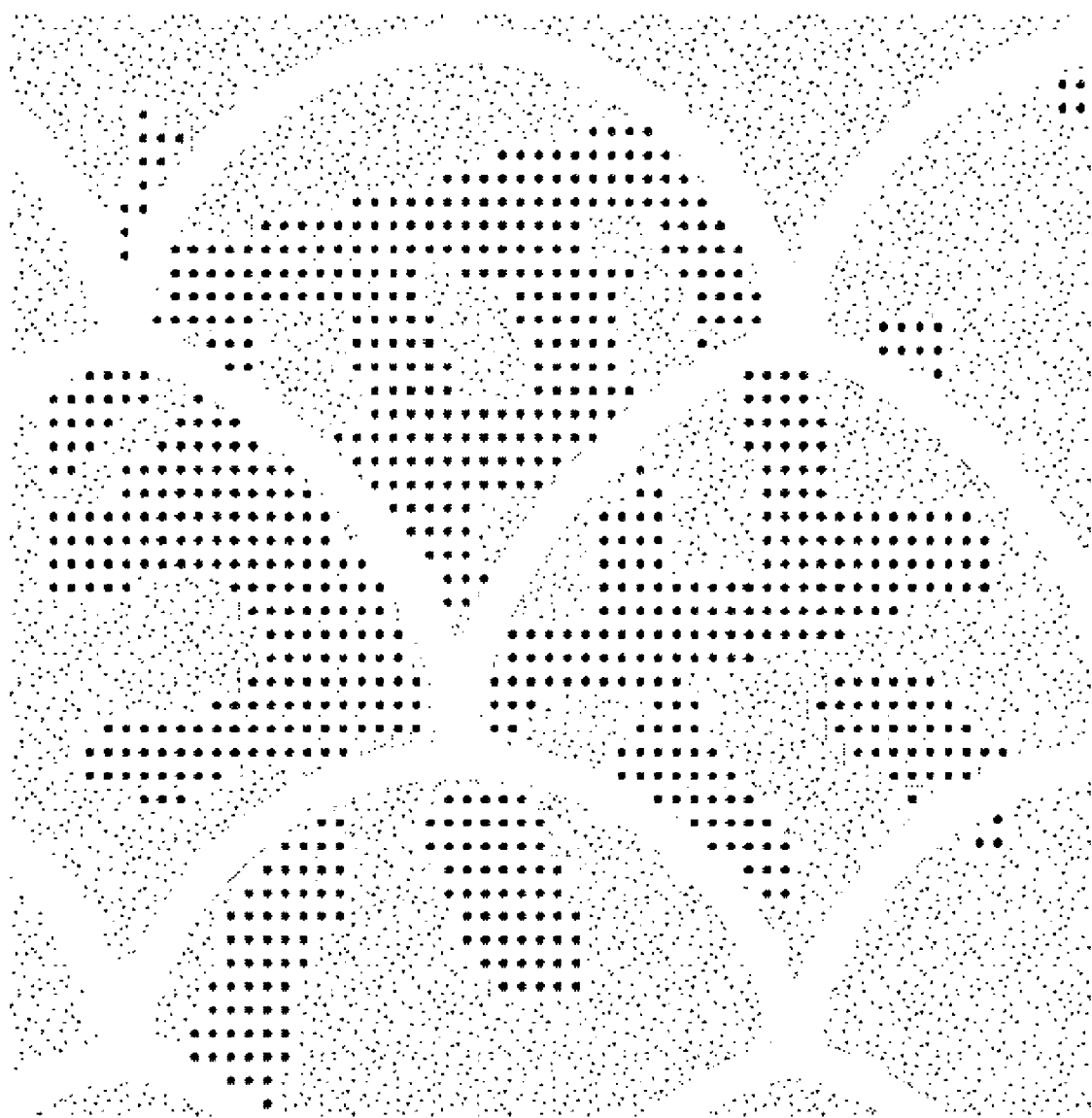
FIG. 9 shows a tint block image subjected to boundary processing.
Figure 10:
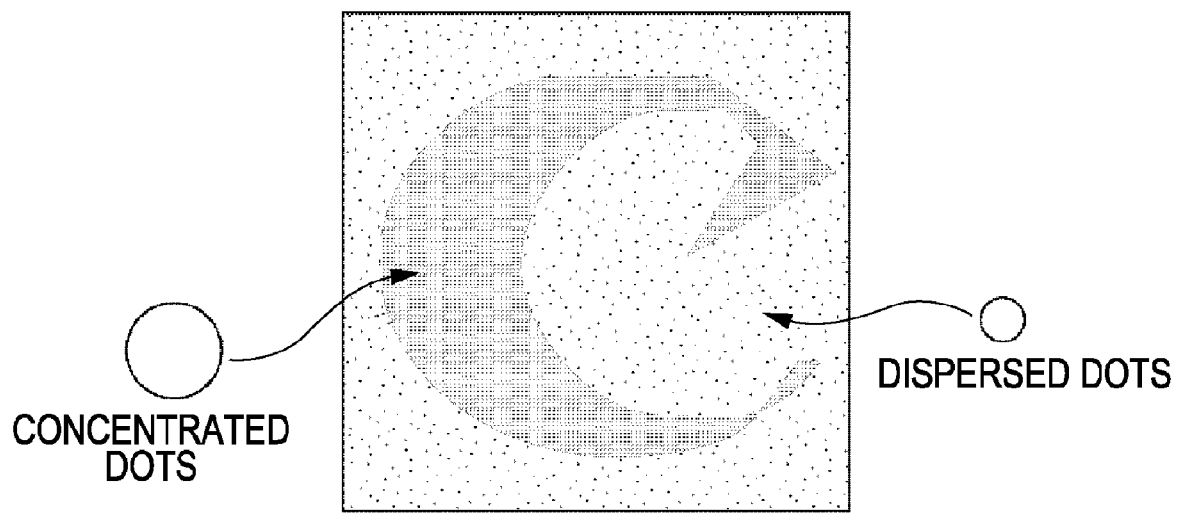
FIG. 10 is a diagram showing dots of which a tint block image is formed.

Thus, the tint block image is obtained via the process described above. In the tint block image obtained via the above-described process, there is a possibility that the dot density becomes high near the boundary between the foreground and the background in the foreground/background area defining image, and thus the outline of the foreground becomes perceivable, which can reduce the effectiveness of the copy-forgery-inhibited pattern. To avoid the above problem, boundary processing may be performed to prevent the dot density from becoming high near the boundary between the foreground and the background in the foreground/background area defining image. FIG. 9 shows an example of a tint block image subjected to the boundary processing.

When a tint block image is produced in step S1901 shown in FIG. 6 or in step S1908 shown in FIG. 7, the method of drawing the tint block image is different between step S1901 and step S1908.

That is, in step S1901 shown in FIG. 6, the drawing of the tint block pattern is performed in the watermark mode in step S2710 so that the tint block image becomes a background image. In step S2710, after the tint block image has been drawn, document data such as text or the like produced by the application software are transparently drawn. In this case, any special process is performed in the drawing of the tint block image.

On the other hand, in step S1908 shown in FIG. 7, the drawing of the tint block pattern is performed in the superimposed mode in step S2711 so that the tint block image is drawn on the already drawn document data. In this case, if the tint block pattern is simply drawn on the document data such as text data produced by the application software, the document data is hidden behind the tint block pattern. To avoid the above problem, the drawing is performed according to AND/OR logical calculation so that the document data is not completely hidden. For example, when pixel values of the lower layer pattern (the document data) are white (that is, the pixel values are equal to 0) at particular pixels, the pixels values of the tint block pattern of pixels corresponding to the above pixels are written. Thereafter the process proceeds to step S2712 and the rendering of the tint block image is ended.

By employing the partial area mode described above, it is possible to produce a tint block at low cost. By preparing standard forms in the partial area mode in addition to forms in the whole area mode, it becomes possible for a user to select a best form that satisfies both requirements in terms of the copy protection effectiveness of the tint block and the low cost. That is, the partial area mode allows a user to produce a tint block at lower cost than the whole area mode which needs high cost for a large amount of toner. Although the partial area mode needs low cost, the tint block produced in the partial area mode allows it to distinguish an original material from a copied material.

In the embodiments described above, the latent character string is right justified for the partial tint block pattern (that is, the single tint block tile) placed at the upper right position or the lower right position, center justified for the partial tint block pattern placed at the center position, and left justified for the partial tint block pattern placed at the upper left position or the lower left position. Alternatively, the latent character string may be top justified for the partial tint block pattern placed at the upper right position or the upper left position, center justified for the partial tint block pattern placed at the center position, and bottom justified for the partial tint block pattern placed at the lower right position or the lower left position.

Alternatively, the latent character string may be top-and-right justified for the partial tint block pattern placed at the upper right position, bottom-and-right justified for the partial tint block pattern placed at the lower right position, center justified for the partial tint block pattern placed at the center position, top-and-left justified for the partial tint block pattern placed at the upper left position, and bottom-and-left justified for the partial tint block pattern placed at the lower left position.

In the embodiments described above, settings of the tint block and the production of PDL data of the tint block are performed on the computer. Alternatively, these processes may be performed on the printer. More specifically, the setting screen shown in FIG. 15 is displayed on the operation unit 1501 and various kinds of settings of the tint block are made via this setting screen. According to the settings, the image controller 1000 (FIG. 1) adds a tint block image to a PDL image data supplied from the computer and the printing unit 17 performs printing according to the resultant data.

Note that the present invention may be applied to a system including a plurality of apparatus or devices (such as a computer, an interface device, a reader, a printer, etc,) or a single apparatus or a device (such as a copier, a printer, a facsimile machine, etc.).

Note that the present invention may be practiced by reading a program code from a storage medium into a computer (or a CPU) of a system or an apparatus and executing the program code on the computer (or the CPU) thereby performing the process according to any embodiment described above with reference to a flow chart.

In this case, the program code read from the storage medium implements the functions disclosed in the embodiments described above, and the storage medium on which the program code is stored falls within the scope of the present invention.

Specific examples of storage media which can be employed in the present invention to supply the program code include a floppy disk, a hard disk, an optical disk, a magneto-optical disk, a CD-ROM, a CD-R, a magnetic tape, a non-volatile memory card, and a ROM.

The functions disclosed in the embodiments may be implemented not only by executing the program code on a computer, but part or all of the process may be performed by an operating system or the like running on the computer in accordance with the program code. Such implementation of the functions also falls within the scope of the present invention.

To implement one or more functions according to any of the above-described embodiments of the invention, the program stored on a storage medium may be loaded into a memory of an extension card inserted in a computer or into a memory of an extension unit connected to the computer, and part or all of the process may be performed by a CPU disposed on the extension card or the extension unit in accordance with the loaded program code. Note that such implementation of the functions also falls within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-306647 filed Oct. 21, 2005, which is hereby incorporated by reference herein in its entirety.

What is claimed is:

1. An information processing apparatus comprising:
one or more processors;
a position specifying unit, implemented by the one or more processors, configured to specify a position at which to form a copy-forgery-inhibited unit pattern, wherein the position specifying unit is adapted to specify at least a right position, a center position, or a left position;
a determination unit, implemented by the one or more processors, configured to determine a justification mode in which to justify a latent character string in accordance with the position specified by the position specifying unit, wherein the determination unit determines the justification mode such that, when specified by the position specifying unit, the latent character string is right justified when a right position is specified, centered justified when a center position is specified, and left justified when a left position is specified;
a font size determination unit, implemented by the one or more processors, configured to determine a font size of the latent character string, in accordance with the size of an area in which the copy-forgery-inhibited unit pattern is formed, wherein the font size determination unit determines the font size so as not to be smaller than a predetermined particular size; and
a discarding unit, implemented by the one or more processors, configured to discard one or more characters included in the latent character string,
wherein, in a case where the latent character string of the predetermined particular size overflows from the area in which the copy-forgery-inhibited unit pattern is formed, (i) the font size determination unit determines the justification mode such that the latent character string is left justified regardless of the position specified by the position specifying unit and (ii) the discarding unit discards the one or more characters so that the one or more characters at the end of the left-justified latent character string are deleted.

2. The information processing apparatus according to claim 1, further comprising:
- a display unit configured to display a display screen for specifying whether to form the copy-forgery-inhibited unit pattern or an array of copy-forgery-inhibited unit patterns,
- wherein the position specifying unit specifies the position at which to form the copy-forgery-inhibited unit pattern based on input of a user via a display screen for specifying the position at which to form the copy-forgery-inhibited unit pattern by selecting the position from a plurality of candidates.

3. A printing apparatus comprising:
- one or more processors;
- a position specifying unit, implemented by the one or more processors, configured to specify a position at which to form a copy-forgery-inhibited unit pattern, wherein the position specifying unit is adapted to specify at least a right position, a center position, or a left position;
- a determination unit, implemented by the one or more processors, configured to determine a justification mode in which to justify a latent character string in accordance with the position specified by the position specifying unit, wherein the determination unit determines the justification mode such that, when specified by the position specifying unit, the latent character string is right justified when a right position is specified, centered justified when the center position is specified, and left justified when the left position is specified;
- a printing unit, implemented by the one or more processors, configured to print an image including the copy-forgery-inhibited unit pattern at the position specified by the position specifying unit;
- a font size determination unit, implemented by the one or more processors, configured to determine a font size of the latent character string, in accordance with the size of the area in which the copy-forgery-inhibited unit pattern is formed, wherein the font size determination unit determines the font size so as not to be smaller than a predetermined particular size; and
- a discarding unit, implemented by the one or more processors, configured to discard one or more characters included in the latent character string,
- wherein, in a case where the latent character string of the predetermined particular size overflows from the area in which the copy-forgery-inhibited unit pattern is formed, (i) the font size determination unit determines the justification mode such that the latent character string is left justified regardless of the position specified by the position specifying unit and (ii) the discarding unit discards the one or more characters so that the one or more characters at the end of the left-justified latent character string are deleted.

4. An information processing method comprising:
- specifying a position at which to form a copy-forgery-inhibited unit pattern, wherein the specifying a position at which to form a copy-forgery-inhibited unit pattern includes specifying at least a right position, a center position, or a left position;
- determining a justification mode in which to justify a latent character string in accordance with a specified position, wherein the justification mode is determined such that the latent character string is right justified when a right position is specified, centered justified when a center position is specified, left justified when a left position is specified;
- determining a font size of the latent character string, in accordance with the size of an area in which the copy-forgery-inhibited unit pattern is formed, wherein the determining the font size comprises determining the font size so as not to be smaller than a predetermined particular size; and
- discarding one or more characters included in the latent character string,
- wherein, in a case where the latent character string of the predetermined particular size overflows from the area in which the copy-forgery-inhibited unit pattern is formed, (i) the determining the font size further comprises determining the justification mode such that the latent character string is left justified regardless of the position specified in the specifying step and (ii) the discarding the one or more characters further comprises discarding the one or more characters so that the one or more characters at the end of the left-justified latent character string are deleted.

5. A non-transitory computer readable medium storing computer-executable process steps for causing a computer to execute the method of claim 4.

6. A printing method comprising:
- specifying a position at which to form a copy-forgery-inhibited unit pattern, wherein the specifying a position at which to form a copy-forgery-inhibited unit pattern includes specifying at least a right position, a center position, or a left position;
- determining a justification mode in which to justify a latent character string in accordance with a specified position, wherein the justification mode is determined such that the latent character string is right justified when a right position is specified, centered justified when a center position is specified, left justified when a left position is specified;
- printing an image including the copy-forgery-inhibited unit pattern at the specified position;
- determining a font size of the latent character string, in accordance with the size of the area in which the copy-forgery-inhibited unit pattern is formed, wherein the determining the font size comprises determining the font size so as not to be smaller than a predetermined particular size; and
- discarding one or more characters included in the latent character string,
- wherein, in a case where the latent character string of the predetermined particular size overflows from the area in which the copy-forgery-inhibited unit pattern is formed, (i) the determining the font size further comprises determining the justification mode such that the latent character string is left justified regardless of the position specified in the specifying step and (ii) the discarding the one or more characters further comprises discarding the one or more characters so that the one or more characters at the end of the left-justified latent character string are deleted.

* * * * *